(12) United States Patent
He et al.

(10) Patent No.: US 11,916,855 B2
(45) Date of Patent: Feb. 27, 2024

(54) FILE COMMENTING METHOD AND APPARATUS, COMMENT VIEWING METHOD AND APPARATUS, COMPUTER DEVICE, AND STORAGE MEDIUM

(71) Applicant: Tencent Technology (Shenzhen) Company Limited, Guangdong (CN)

(72) Inventors: Fen He, Shenzhen (CN); Xuejun Sun, Shenzhen (CN); Liqiang Liu, Shenzhen (CN); Dan He, Shenzhen (CN); Jinhui Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/702,349

(22) Filed: Mar. 23, 2022

(65) Prior Publication Data

US 2022/0217108 A1 Jul. 7, 2022

Related U.S. Application Data

(63) Continuation of application No. PCT/CN2020/122703, filed on Oct. 22, 2020.

(30) Foreign Application Priority Data

Feb. 21, 2020 (CN) .......................... 202010109009.1

(51) Int. Cl.
*G06F 17/00* (2019.01)
*G06F 3/0482* (2013.01)
(Continued)

(52) U.S. Cl.
CPC .......... *H04L 51/046* (2013.01); *G06F 3/0482* (2013.01); *G06F 3/0484* (2013.01); *G06F 40/169* (2020.01); *H04L 51/10* (2013.01)

(58) Field of Classification Search
CPC ..... H04L 51/046; H04L 51/10; G06F 3/0482; G06F 3/0484; G06F 40/169
(Continued)

(56) References Cited

U.S. PATENT DOCUMENTS 8,374,975 B1 * 2/2013 Cierniak ............... G06F 16/355
706/12
10,679,627 B2 * 6/2020 Ramasamy ............. G10L 15/30
(Continued)

FOREIGN PATENT DOCUMENTS

CN 103347091 A 10/2013
CN 104952095 A 9/2015
(Continued)

OTHER PUBLICATIONS

Churchill, 'Anchored Conversations: Chatting in the context of a document', CHI '2000 The Hague, Amsterdam, ACM (Year: 2000).*
(Continued)

*Primary Examiner* — Stephen S Hong
*Assistant Examiner* — Matthew J Ludwig
(74) *Attorney, Agent, or Firm* — ARENTFOX SCHIFF LLP

(57) ABSTRACT

A file commenting method includes displaying file content in an instant messaging client, displaying comment content entered via a commenting operation performed on a portion of the file content, and displaying a session page when the commenting operation is completed, the session page including the portion of the file content, the comment content, and a file identifier corresponding to the file content.

20 Claims, 28 Drawing Sheets

(51) Int. Cl.
*G06F 3/0484* (2022.01)
*G06F 40/169* (2020.01)
*H04L 51/046* (2022.01)
*H04L 51/10* (2022.01)

(58) Field of Classification Search
USPC .......................................................... 715/230
See application file for complete search history.

(56) References Cited

U.S. PATENT DOCUMENTS

| | | | | |
|---|---|---|---|---|
| 2004/0205547 | A1* | 10/2004 | Feldt | G06F 40/169 |
| | | | | 715/201 |
| 2011/0099463 | A1* | 4/2011 | Abagyan | G06T 19/00 |
| | | | | 715/202 |
| 2013/0212507 | A1* | 8/2013 | Fedoseyeva | G06Q 30/00 |
| | | | | 715/765 |
| 2014/0188803 | A1* | 7/2014 | James | G06F 16/178 |
| | | | | 707/638 |
| 2014/0258972 | A1* | 9/2014 | Savage | G06F 9/451 |
| | | | | 717/106 |
| 2014/0380173 | A1 | 12/2014 | Zhang | |
| 2016/0100019 | A1* | 4/2016 | Leondires | H04L 63/105 |
| | | | | 709/204 |
| 2016/0219057 | A1* | 7/2016 | Das | G06F 21/6209 |
| 2016/0308940 | A1* | 10/2016 | Procopio | H04L 67/10 |
| 2016/0344667 | A1* | 11/2016 | Lane | H04L 51/18 |
| 2017/0017658 | A1* | 1/2017 | Blong | G06F 16/44 |
| 2017/0032021 | A1* | 2/2017 | Watanachote | H04L 51/52 |
| 2017/0353410 | A1* | 12/2017 | Gonzales | H04L 51/063 |
| 2018/0077092 | A1* | 3/2018 | Jalil | G06Q 10/101 |
| 2018/0276559 | A1* | 9/2018 | Kodali | G06F 16/2455 |
| 2018/0302462 | A1* | 10/2018 | Kwon | G06F 16/432 |
| 2019/0272071 | A1* | 9/2019 | Greenberger | G06F 16/93 |
| 2020/0366629 | A1* | 11/2020 | Jalil | H04L 67/02 |
| 2021/0067570 | A1* | 3/2021 | Chen | H04L 51/046 |
| 2022/0086238 | A1* | 3/2022 | Oh | H04L 51/56 |

FOREIGN PATENT DOCUMENTS

| | | |
|---|---|---|
| CN | 105630353 A | 6/2016 |
| CN | 105912224 A | 8/2016 |
| CN | 109726367 A | 5/2019 |
| CN | 110061900 A | 7/2019 |
| CN | 111240543 A | 6/2020 |
| CN | 111325004 A | 6/2020 |

OTHER PUBLICATIONS

International Search Report and Written Opinion dated Jan. 20, 2021 in Application No. PCT/CN2020/122703 with English Translation.
Chinese Office Action dated May 7, 2021 in Patent Application No. 202010109009.1 with English Translation.

* cited by examiner

FILE COMMENTING METHOD AND APPARATUS, COMMENT VIEWING METHOD AND APPARATUS, COMPUTER DEVICE, AND STORAGE MEDIUM

RELATED APPLICATIONS

This application is a continuation of International Application No. PCT/CN2020/122703, filed on Oct. 22, 2020, which claims priority to Chinese Patent Application No. 202010109009.1, entitled "FILE COMMENTING METHOD AND COMMENT VIEWING METHOD" and filed on Feb. 21, 2020. The disclosures of the prior applications are hereby incorporated by reference in their entirety.

FIELD OF THE TECHNOLOGY

This application relates to the field of Internet technologies, including a file commenting method and apparatus, a comment viewing method and apparatus, a computer device, and a storage medium.

BACKGROUND OF THE DISCLOSURE

Currently, commenting on target content of file content is an operation that conveys a point of view and improves efficiency. In an Internet communication scenario based on an instant messaging technology, to send a comment on file content to a receiving party, the file that includes the comment needs to be sent to the receiving party. If the file includes multiple comments and each comment corresponds to one piece of target content of file content, the receiving party needs to take a particular time to determine, among comments corresponding to multiple pieces of target content, a comment corresponding to target viewing content.

In the research and practice process of the related art, the inventors of this application find that the related art has the disadvantage of low commenting efficiency.

SUMMARY

According to various embodiments of this disclosure, a file commenting method and apparatus, a comment viewing method and apparatus, a computer device, and a non-transitory computer-readable storage medium are provided.

In an embodiment, a file commenting method includes displaying a file content page of an instant messaging client, the file content page comprising file content, displaying comment content based on a commenting operation performed on a portion of the file content, and displaying a session page in response to a determination that the commenting operation performed on the portion of the file content is completed, the session page including a comment message, and the comment message comprising the portion of the file content, the comment content, and a file identifier corresponding to the file content.

In an embodiment, a comment viewing method includes displaying a session page of an instant messaging client, the session page including a first comment message sent by a first commentor, and the first comment message including comment content of the first commentor on a first portion of a target file. The comment viewing method further includes displaying a first file content page in response to detection of a viewing operation performed on the first comment message, the first file content page including the target file, a comment identifier of the first portion of the target file, the comment content, and identification of the first commentor.

In an embodiment, a file commenting method includes displaying a file content page of an instant messaging client, the file content page including file content, displaying a comment control in response to detection of a selection operation selecting a portion of the file content, and displaying a session page of a commentor in response to detection of an operation performed on the comment control. The method further includes displaying comment content on the session page based on a comment editing operation performed on the portion of the file content on the session page, and displaying, on the session page in response to a determination that the comment editing operation performed on the portion of the file content is completed, a comment message sent by the commentor, and adding a comment identifier to the portion of the file content, the comment message including the portion of the file content, the comment content, and a file identifier corresponding to the file content.

Details of one or more embodiments of this disclosure are provided in the accompanying drawings and descriptions below. Other features and advantages of this disclosure may be understood with reference to the specification, the accompanying drawings, and the claims.

BRIEF DESCRIPTION OF THE DRAWINGS

To describe the technical solutions in the embodiments of this disclosure, the following briefly describes the accompanying drawings describing the embodiments. The accompanying drawings in the following description show some embodiments of this disclosure, and a person skilled in the art may still derive other drawings from these accompanying drawings.

DESCRIPTION OF EMBODIMENTS

The following describes the technical solutions in the embodiments of this disclosure with reference to the accompanying drawings. The described embodiments are some of the embodiments of this disclosure rather than all of the embodiments. Other embodiments within the scope of the present disclosure may be obtained by a person skilled in the art based on the embodiments of this disclosure.

The embodiments of this disclosure provide a file commenting method and a comment viewing method. Specifically, an embodiment of this disclosure may be integrated in a first commenting apparatus and a second commenting apparatus. The first commenting apparatus may be integrated in a first computer device. The first computer device may be an electronic device such as a terminal or a server. The terminal may be an electronic device such as a smartphone, a tablet computer, a notebook computer, or a personal computer. The server may be a single server, or may be a server cluster.

The second commenting apparatus may be integrated in a second computer device. The second computer device may be an electronic device such as a terminal or a server. The terminal may be an electronic device such as a smartphone, a tablet computer, a notebook computer, or a personal computer. The server may be a single server, or may be a server cluster. The server may be a web page server, an application program server, a data server, or the like.

In the following, for example, the first computer device is a terminal, and the second computer device is a server, and the file commenting method and the comment viewing method are described in the embodiments of this disclosure.

Figure 1:
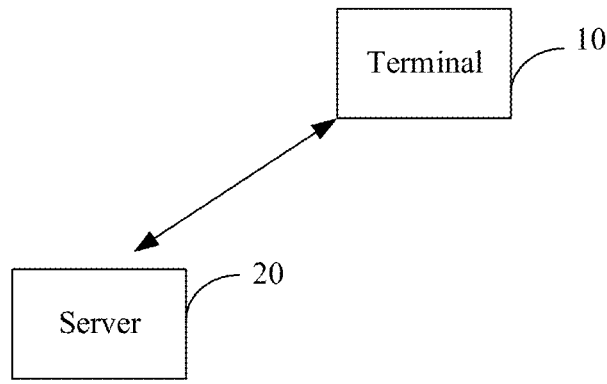
FIG. 1 is a schematic diagram of a scenario of a file commenting method and a comment viewing method according to an embodiment of this disclosure.

As shown in FIG. 1, in the solution of the embodiments of this disclosure, a terminal and a server interact with each other. A commenting and viewing system (hereinafter referred to as a commenting system) is described in the embodiments. A first commenting apparatus integrated on the terminal 10 and a second commenting apparatus integrated on the server 20 are used as an example.

Specifically, the first commenting apparatus on the terminal 10 may display a file content page of an instant messaging client, where the file content page includes file content of a target file; display comment content of target content (e.g., a portion of the file content) based on a commenting operation performed on the target content of the file content; and display a session page of a commenting object (e.g., a commentor) in response to a determination that the commenting operation performed on the target content is completed, where the session page includes a comment message of the target file that is sent by the commenting object, and the comment message includes the target content, the comment content, and a file identifier of the target file.

For example, the terminal 10 may display file content "A.doc" on a file content page of instant messaging software. A commenting object Xiaoyi may select the portion "shou qu yi zhi" from file content as target content and comment on the target content. Comment content may be "typo". When Xiaoyi completes a commenting operation on the target content, a comment message of Xiaoyi may be displayed on a session page of the instant messaging software. The comment message may include the target content "shou qu yi zhi", the comment content "typo", and the file identifier "A.doc" of the target file.

The server 20 may send file content to the terminal based on requirements of the terminal in different application scenarios. When a commenting operation is completed on the terminal, the server may receive comment-related data sent by the terminal, for example, comment content, target content, and a commenting object. The server may further send the comment-related data to a session page of the terminal. In this case, the comment-related data may be displayed on the session page in the form of a comment message.

For example, the server 20 sends the file content "A.doc" to the instant messaging software, and the commenting object Xiaoyi provides comment content "typo" on the target content "shou qu yi zhi". The server 20 may receive comment-related data that includes Xiaoyi, "shou qu yi zhi", "typo", and the like sent by the terminal. The server 20 may further send the comment-related data back to the terminal 10 and/or to a different terminal, so that the recipient terminal(s) may display the comment-related data in the form of a comment message on the session page.

Specifically, the first commenting apparatus on the terminal 10 may further display a session page of an instant messaging client, where the session page includes a first comment message sent by a first commenting object (e.g., a first commentor), and the first comment message includes comment content of the first commenting object on first target content (e.g., a first portion) of a target file; and display a first file content page in response to detection of a viewing operation performed on the first comment message, where the first file content page includes: file content of the target file, a comment identifier of the first target content of file content (e.g., a first portion of the file content), the comment content of the first target content, and the first commenting object.

For example, the terminal 10 may display the first comment message of Xiaoyi on the session page of the instant messaging software. The first comment message may include the comment content of Xiaoyi on the first target content in the target file, the target content may be "shou qu yi zhi", and the comment content may be "typo". When detecting a viewing operation performed by Xiaoyi on the first comment message, the terminal 10 may display the file content of the target file, the comment identifier of the target content "shou qu yi zhi" (the comment identifier may emphasize "shou qu yi zhi", such as the font size is increased or display is highlighted), "typo", and Xiaoyi on the first file content page.

The server 20 may determine an initial file based on a viewing operation performed on the first comment message and obtain comment information to be applied to the initial file. The comment information includes location information, commenting object (e.g., commentor) information, and comment content information. The server 20 determines target content (e.g., a portion) of the initial file based on the location information, adds a comment identifier of the target content, comment content, and a commenting object to file content of the initial file, to obtain a target file, and displays the first file content page. The first file page includes the file content of the target file.

For example, when receiving a viewing request for the first comment message sent by Xiaoyi on the terminal, the server 20 may determine the initial file "A.doc" of the first comment viewing message, obtain location information (for example, lines 12-15), commenting object information (for example, Xiaoyi), and comment content information (for example, "typo") included in the first comment message, determine the target content as "shou qu yi zhi" according to lines 12-15, add the file identifier of "shou qu yi zhi", Xiaoyi, and "typo" to a corresponding position of the initial file, to obtain a target file, and then send the target file to the terminal, so that the terminal may display file content of the target file on the file content page.

Detailed descriptions are separately provided below. The description sequence of the following embodiments is not intended to limit preference orders of the embodiments.

Figure 2:
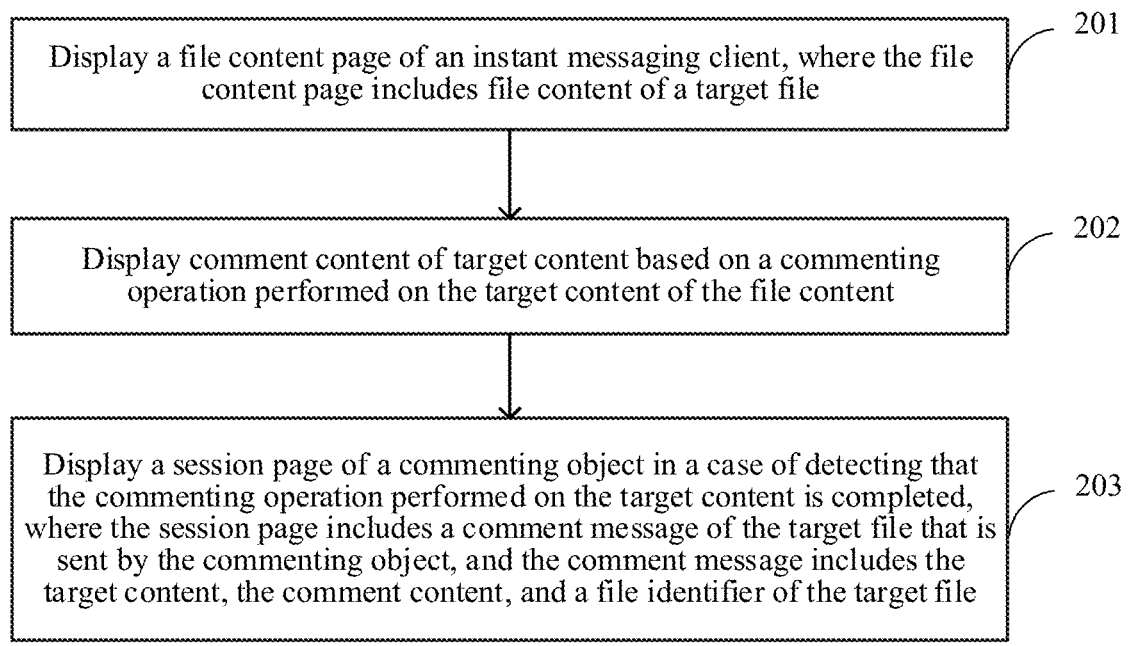
FIG. 2 is a schematic flowchart of a file commenting method according to an embodiment of this disclosure.

An embodiment of this disclosure provides a file commenting method. The method may be integrated and implemented in a terminal installed with a processor. As shown in FIG. 2, a specific procedure of the file commenting method may be as follows.

In step 201, a file content page of an instant messaging client is displayed, where the file content page includes file content of a target file.

The file in this embodiment of this disclosure may be a virtual file stored on a computer device (such as a terminal or a server). The file may include a particular amount of information and occupy a particular storage space on the computer device based on the amount of information. The type of the file has a wide range and may be determined according to an identifier of the file. Specifically, the file may be a character file such as an electronic book file including a TXT identifier, or a data file including an HTML identifier; the file may be a picture file such as a screenshot file including a PNG identifier; or the file may be an audio/video file such as a song file including an M4A identifier or a video file including a TS identifier.

As computer devices storing the file vary, forms of file identifiers are also different when the file is obtained. If the file is stored on the terminal locally, the file may be directly opened by software pre-installed on the terminal. This manner depends on the software pre-installed on the computer device. A common file may be conveniently and quickly opened. For example, the instant messaging client may open the file and perform a viewing operation on file content of the file.

If the file is stored on the server, the terminal may obtain the file on the server by sending a request message and view file content of the file. This manner may reduce the storage load on the terminal and save the storage space of the terminal. A viewing operation is performed on the file through the request message when the file content needs to be viewed. For example, the instant messaging client may view, based on a network address, the file content stored on the server.

The file content page may display file content. The type of the file content may be character, picture, audio/video, or the like. The type of the file content of the file may be a single type, such as a file only including characters, or two or more types, such as a file including a video and characters. When the file content page displays file content, a display manner may be adjusted for different types. The file content may be displayed on a split screen, or the file content currently displayed on the file content page may be adjusted based on a user operation such as enlarging and jumping. For example, if the file content page displays a picture, based on a display enlarging operation performed by a user on the picture, the file content page may display an enlarged partial area of the picture.

The target file is a file displayed on the file content page, and the file content of the target file may be all or a part of an amount of information included in the target file. For example, if the target file is opened based on a network address, the file content may be file content of the file corresponding to the network address, or may be attribute information of the file, or may be a comment on the file or the file content. If the file content of the target file has multiple forms, the file content may be one or more forms of the target file. For example, if the target file is an audio file, file content corresponding to the audio file may include audio, may include audio and text information in the audio, and may include waveforms of the audio.

Figure 3:
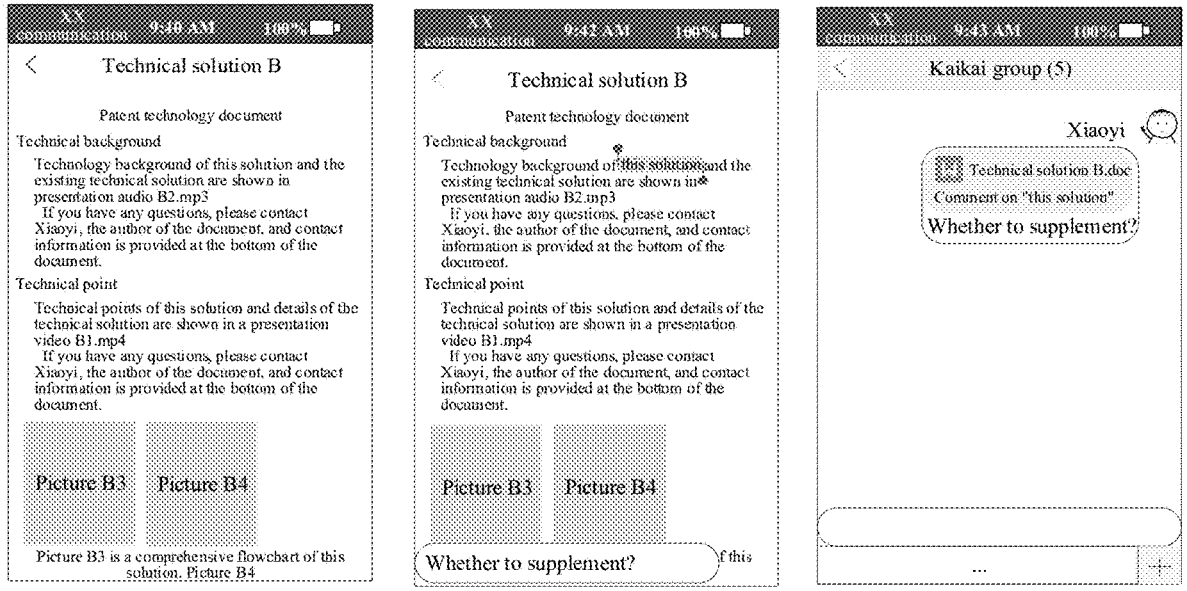
FIG. 3 is an exemplary diagram of a page operation of a file commenting method according to an embodiment of this disclosure.

For example, referring to FIG. 3, the file identifier of the target file is "technical solution B.doc" (".doc" is hidden in FIG. 3). The file content page displays partial file content (i.e., a portion) of the target file, including a text and pictures. The pictures are "picture B3" and "picture B4". The text is "Patent technology document. Technical background. Technology background of this solution and the existing technical solution are shown in demonstration audio B2.mp3. If you have any questions, please contact Xiaoyi, the author of the document, and contact information is provided at the bottom of the document. Technical points. Technical points of this solution and details of the technical solution are shown in a demonstration video B1.mp4. If you have any questions, please contact Xiaoyi, the author of the document, and contact information is provided at the bottom of the document. Picture B3 is a comprehensive flowchart of this solution. Picture B4".

In an embodiment, before the file content page of the instant messaging client is displayed, where the file content page includes the file content of the target file, the method may include the following step: displaying a file list page of a commenting object in the instant messaging client, where the file list page includes a file identifier of at least one file, and based on a determining operation (e.g., a selection operation) performed on a target file identifier (e.g., selected file identifier), displaying a file content page corresponding to the target file identifier.

The commenting object may be an object that performs a commenting operation. Specifically, a commenting object may be a user in an actual application scenario, or may be a test program, a smart device, or a test person in a simulated scenario. For example, an instant application of an alpha version is automatically tested by a test engineer with a test device. In this case, a commenting object is the test device.

The file list page may be a page including a file identifier of at least one file and displays a file identifier, so that a commenting object may determine a target file identifier from at least one file identifier. The target file identifier corresponds to a target file.

In this embodiment of this disclosure, a control may take various forms, such as an input box, an icon, and a button, or a combination of these forms.

The file list page displayed in the instant messaging client may have multiple sources. If the commenting object is in a session scenario, the file list page may be obtained by integrating file messages of history messages of the session and displaying all the file messages. A number of session persons in the session scenario is not limited. The session scenario may be a group with at least one person or may be a one-on-one session. File messages may be integrated in multiple manners and may be integrated with the help of an auxiliary control in the session. For example, the auxiliary control may be a search control. All history messages are retrieved by searching keywords, to obtain history file messages, and a file list page including the history file messages is displayed. The auxiliary control may be a file display control. The history file messages are obtained by triggering the file display control, and the file list page including the history file messages is displayed.

The file list page may be an intermediate page for completing a file upload operation. The file list page is displayed through an upload control of the instant messaging client (the upload control may be set on a function page, a setting page, or a session page of the client). The file list page includes at least one file identifier. A file corresponding to the file identifier may be a file stored on a computer device installed with the instant messaging client, or an online file stored by the commenting object or other commenting objects. The online file may be stored in the cloud, may be stored on a server, or the like.

The file list page may also be displayed by triggering other functional controls in the instant messaging client. Specifically, a file list may be obtained based on setting of the commenting object. In this case, a control that may display the file list may be triggered to display a file list page. For example, the instant messaging client may include a collection control, and the collection control may be triggered to display collection content of the commenting object. The collection content may include various types of files. Functional controls such as entertainment, shopping, and learning may be triggered to display the file list page. For example, a book reading functional control may be triggered to display a file list page including several book files; and a learning functional control may be triggered to display a file list page including learning resources such as a video, audio, and a picture.

The determining operation performed on the target file identifier may be an operation such as a single click, a continuous click, long press, or sliding performed on the target file identifier. The type of determining operation is subject to the system parameters and design and is not limited herein.

Figure 4:
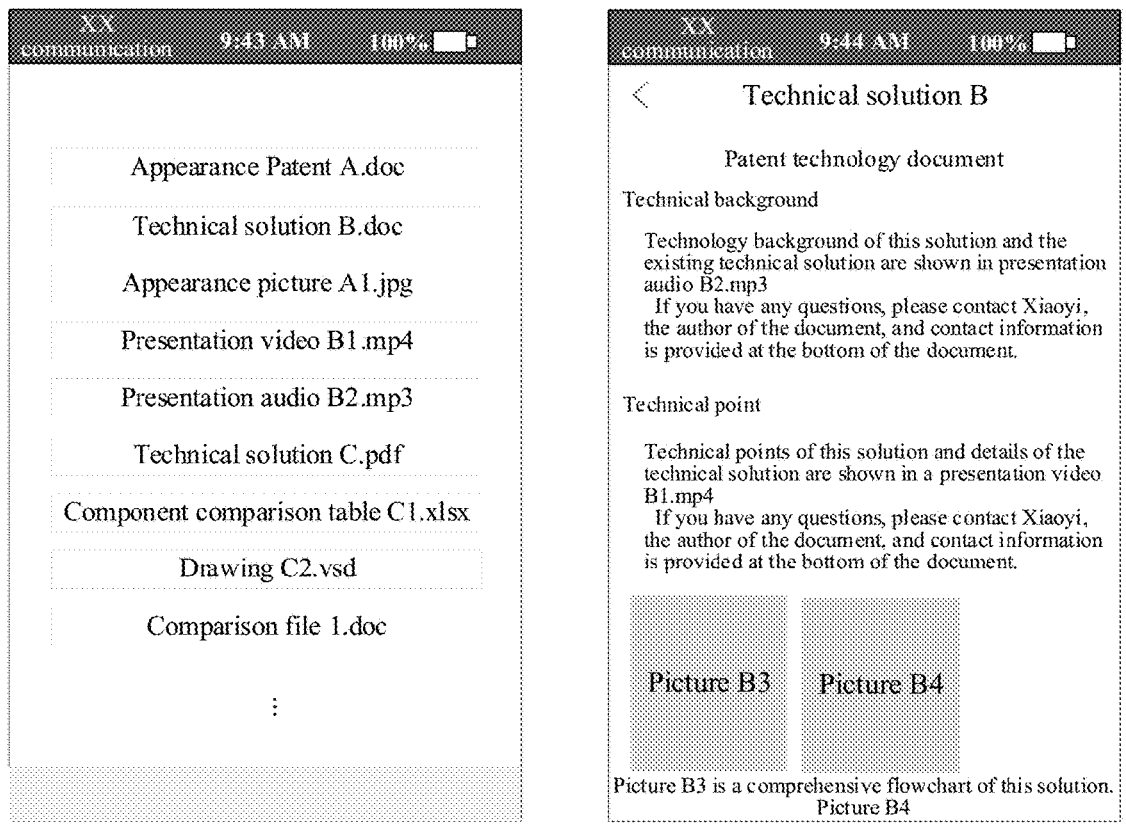
FIG. 4 is an exemplary diagram of some page operations of a file commenting method according to an embodiment of this disclosure.

For example, referring to FIG. 4, the file list page includes file identifiers of a text file, a video file, and an audio file. Based on a continuous click operation performed on a file identifier "technical solution B.doc" of a text file, "technical solution B.doc" is determined as a target file identifier, and file content of "technical solution B.doc" is displayed on the file content page.

In an embodiment, before the file content page of the instant messaging client is displayed, where the file content page includes the file content of the target file, the method may include the following step: displaying the session page of the commenting object in the instant messaging client, where the session page includes a file message of the target file sent by an object in a session; and when detecting a viewing operation performed on the file message, displaying the file content page, where the file content page includes the file content of the target file.

The file message may be a message including a file identifier sent by any object in the session, and the file identifier corresponds to a file. The session page may be a page used by an object in a session scenario to send and receive a message and is mainly used for communication between objects (e.g., commentors).

The viewing operation performed on the file message may be an operation such as a single click, a continuous click, long press, or sliding performed on the file message. The type of viewing operation is subject to system parameters and design and is not limited herein.

The target file is directly determined based on the file message displayed on the session page, and the file content of the target file is displayed. This may conveniently and quickly display the file content in the session, simplify the operation, and improve the operation efficiency.

Figure 5:
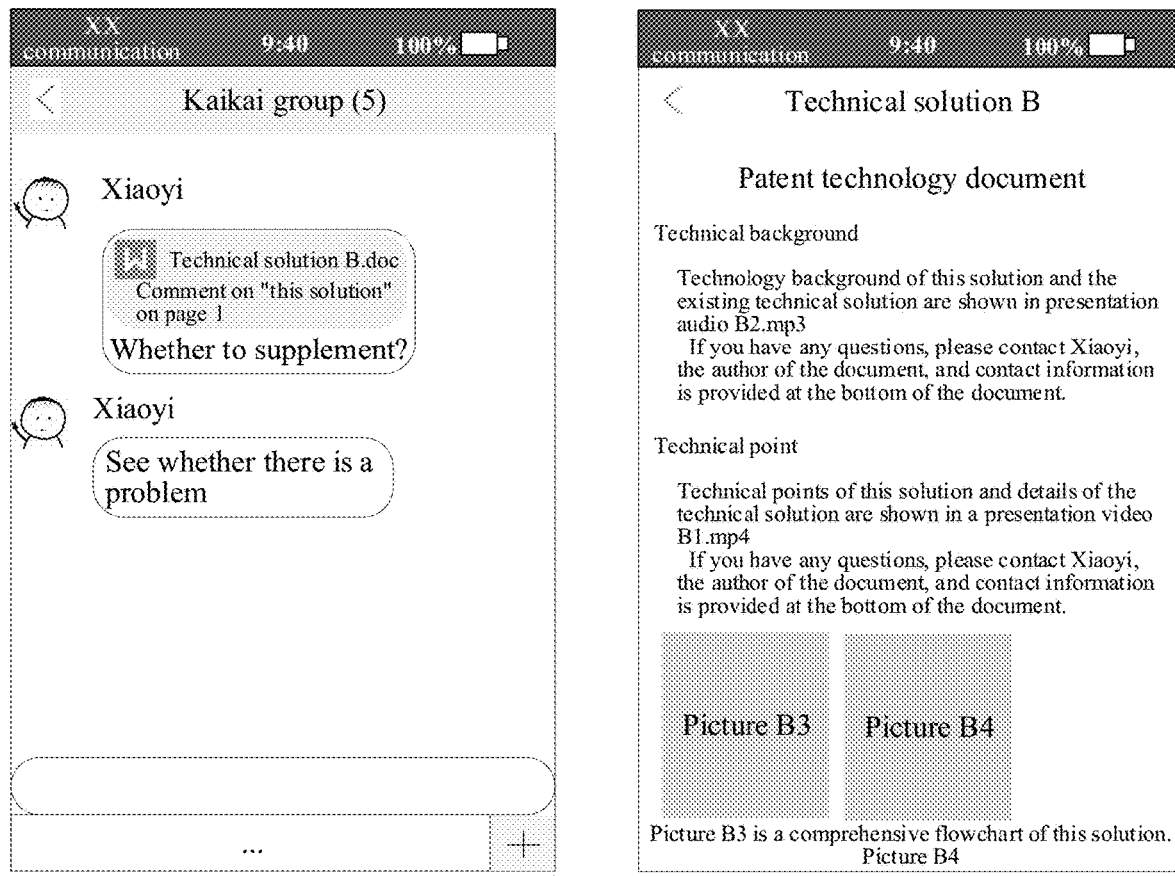
FIG. 5 is an exemplary diagram of some other page operations of a file commenting method according to an embodiment of this disclosure.

For example, referring to FIG. 5, on instant messaging client of a commenting object Xiaoer, a session page of a group "kaikai group" displays a file message. The file message is sent by an object Xiaoyi, and a file identifier is "technical solution B.doc". When a click operation performed by Xiaoer on the file message is detected, the file content page is displayed, where the file content page includes file content of "technical solution B.doc".

In step 202, comment content of target content (e.g., a portion of the file content) is displayed based on a commenting operation performed on the target content of the file content.

The target content includes to-be-commented content selected by the user from the file content, and the target content may be a subset of the file content. The comment content includes a comment made by the commenting object on the target content. The form of the comment content is not limited and may be a text, a character (a character set including at least one single character or a character set such as a network address or an emoticon), an emoji, a picture (a static picture or a dynamic picture), a small video, or the like. This may be autonomously set according to the characteristic of the client and an actual scenario.

The commenting operation performed on the target content of the file content may include manually entering comment text by a commenting object or may include automatically generating a comment by the client based on a trigger, or the like.

The comment content may be displayed in multiple display methods. For example, when the user comments on the target content on the file content page, the client may display, on the file content page in real time, the comment content entered by the user or display comment content already provided by the user on other target content or display comment content already provided by another user on the target content. The comment content already provided may be displayed to provide the user with reference. The comment content already provided may be directly displayed on the file content page, or displayed on a particular comment content display page, or the like.

The target content is selected and the commenting operation is performed. In this way, the file content may be commented in a more targeted manner. In addition, for the commenting object (i.e., commentor) and the viewing object (i.e., viewer) viewing the comment, the operation of directly commenting on the target content can significantly improve commenting efficiency and viewing efficiency.

For example, referring to FIG. 3, the commenting object selects "this solution" as the target content and comments on the target content, and the comment content is displayed as "whether to supplement?".

In an embodiment, the displaying the comment content of the target content based on the commenting operation performed on the target content of the file content may include the following step: when a selection operation performed on the target content of the file content is detected, displaying a comment editing control of the target content; and based on an editing operation performed on the comment editing control, displaying the comment content of the target content.

The selection operation may serve to select the target content based on an operation such as long press or a click of the object, and the selected target content is displayed differently (e.g., highlighted).

The comment editing control is used to edit and determine the comment content of the target content, and display the comment content in real time in an editing process, to facilitate viewing and modifying of the comment editing content. The comment content in the comment editing control may be entered by the commenting object, automatically filled, or the like.

The editing operation performed on the comment editing control may be entering content such as entering a character or entering a picture, or modifying and adjusting entered content. The editing operation may be a process of determining the target content based on particular preset content, for example, a target dynamic picture is selected from a stored dynamic picture set.

Figure 6:
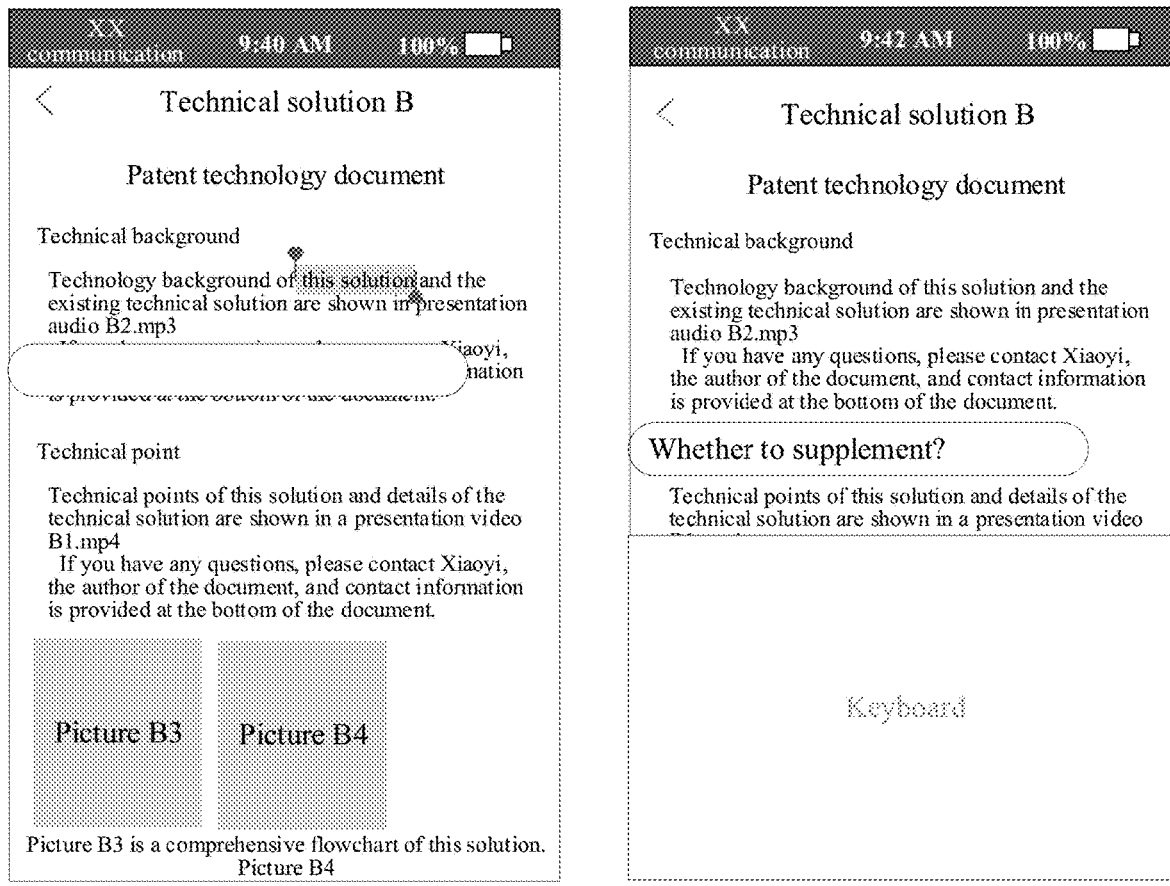
FIG. 6 is an exemplary diagram of some other page operations of a file commenting method according to an embodiment of this disclosure.

For example, referring to FIG. 6, when the target content "this solution" is selected (the selection operation is indicated by differently displaying the target content "this solution"), the comment editing control of the target content is displayed, that is, a rectangular input box in FIG. 6. The comment content entered by the commenting object may be displayed in a rectangular comment input box in real time, that is, a rectangular input box that includes a text "whether to supplement?" in FIG. 6.

In an embodiment, the displaying a comment editing control of target content in response to detection of a selection operation performed on the target content of the file content may include the following step: when a selection operation performed on the target content of the file content is detected, displaying a comment control of the target content; and based on a triggering operation performed on the comment control, displaying the comment editing control of the target content.

The selection operation may serve to select the target content based on an operation such as long press or a click of the object, and the selected target content is displayed differently.

The comment control is a start point for performing a commenting operation on the target content. When the target content is selected, another operation, such as copying, other than commenting may be performed on the target content and corresponds to another functional control. In this case, a comment control in parallel with another functional control is set, and an actual commenting operation is performed through the comment control. This can improve functional diversity and conciseness of the page.

Figure 7:
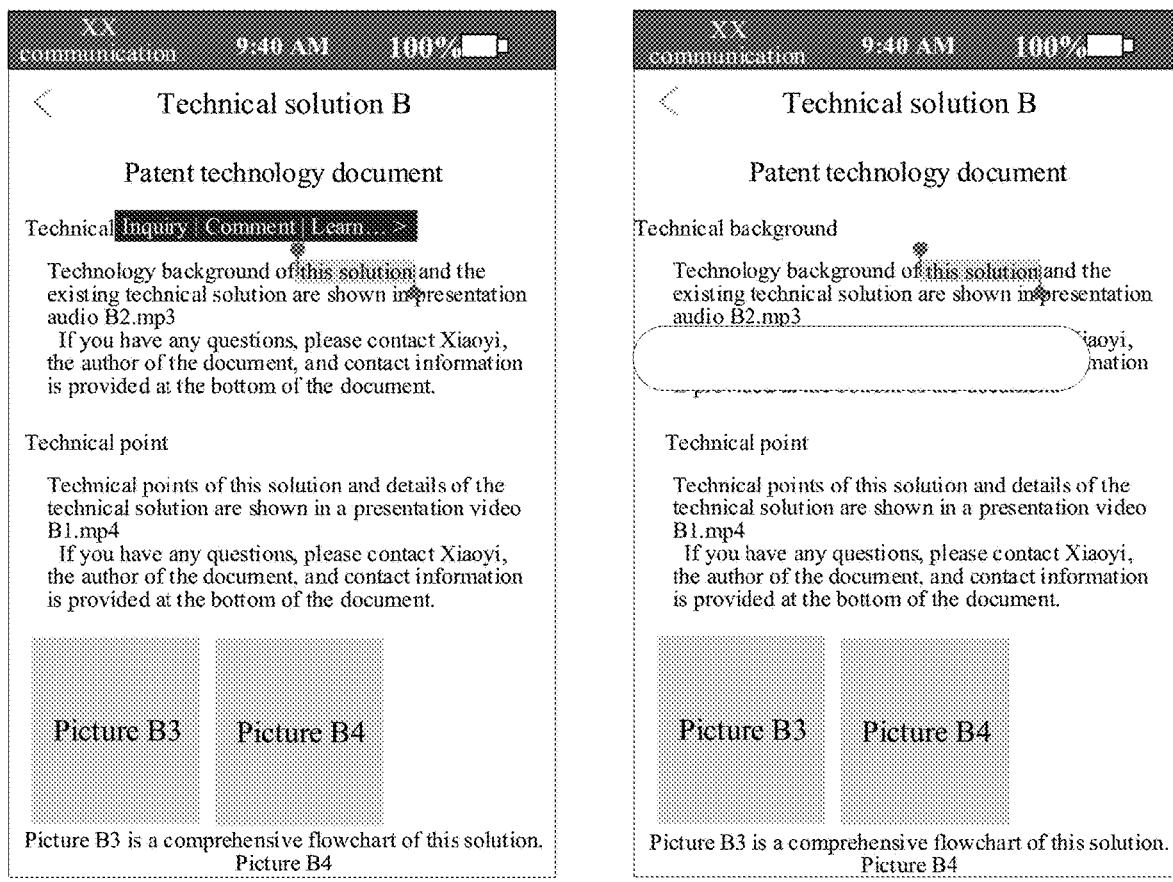
FIG. 7 is an exemplary diagram of some other page operations of a file commenting method according to an embodiment of this disclosure.

For example, referring to FIG. 7, when the target content "this solution" is selected, the comment control of the target content, that is, a comment button in FIG. 7, is displayed. Based on a triggering operation performed on the comment button, the comment editing control, that is, the rectangular input box in FIG. 7, of the target content "this solution" is displayed.

In an embodiment, the displaying the comment content of the target content based on the editing operation performed on the comment editing control may include the following step: displaying the comment content of the target content based on a triggering operation performed on the comment editing control in the content editing area.

The comment content editing page may include a comment content editing area. The comment content editing area includes the comment editing control, and may include other functional controls in addition to the comment editing control. Other functional controls may expand the source of the comment content, for example, may include an emoji control and a picture control.

In addition, the comment content editing page may also include other areas in addition to the comment content editing area, to improve functionality of the comment content editing page. For example, the comment content editing page may include a history message display area, and the history message display area may include a history message sent by an object in the session, so that the commenting object may refer to the history message when editing the comment content. In this case, the comment content editing page is similar to the session page. Therefore, the comment may be edited by displaying the session page. Specifically, a procedure of the file commenting method may be as follows:

A file content page of an instant messaging client is displayed, where the file content page includes file content of a target file; a comment control of target content is displayed in response to detection of a selection operation performed on the target content of the file content; a session page of a commenting object is displayed in response to detection of an operation performed on the comment control; and comment editing content is displayed on the session page based on a comment editing operation performed on the target content on the session page; and a comment message of the target file that is sent by the commenting object is displayed on the session page in response to a determination that the comment editing operation performed on the target content is completed, and a comment identifier is added to the target content of the file content, where the comment message includes the target content, the comment content, and a file identifier of the target file.

In another example, the comment content editing page may include a target content comment display area, and the target content comment display area may display other comment content of another commenting object (i.e., another commentor) on the target content. This may provide reference to the commenting object.

Figure 8:
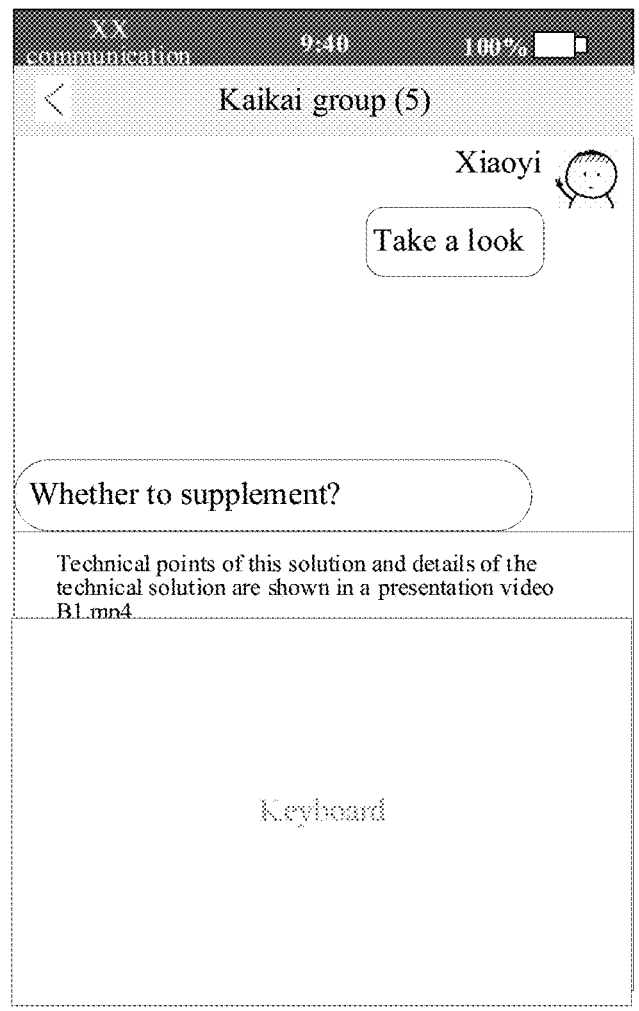
FIG. 8 is an exemplary diagram of some other page operations of a file commenting method according to an embodiment of this disclosure.

For example, referring to FIG. 8, the comment content editing page includes a history message display area. The history message display area displays a group identifier "kaikai group (5)" and a history message "take a look" sent by the object Xiaoyi. The comment content editing page further includes a comment content editing area. The comment content editing area displays the comment content "whether to supplement?" of the target content.

In an embodiment, the comment content includes a specified message receiving identifier and comment editing content, and the displaying the comment content of the target content based on an editing operation performed on the comment editing control may include displaying a specified message receiving identifier of the target object (e.g., target recipient) based on a specified operation performed on the target object in the comment editing control; and displaying, based on a content editing operation in the comment editing control, comment editing content of the target content that corresponds to the specified message receiving identifier of the target object.

To remind a particular object (e.g., a particular user) to view the comment message, the commenting object (e.g., a commentor) may select the target object from the session. This can be achieved by setting a specified message receiving identifier for the target object. The instant messaging client of the target object (the particular user) reminds the target object to view the comment in a particular manner, for example, sends a viewing prompt message to the target object. The number of target objects may be unlimited, and a target object may have a corresponding specified message receiving identifier.

Figure 10:
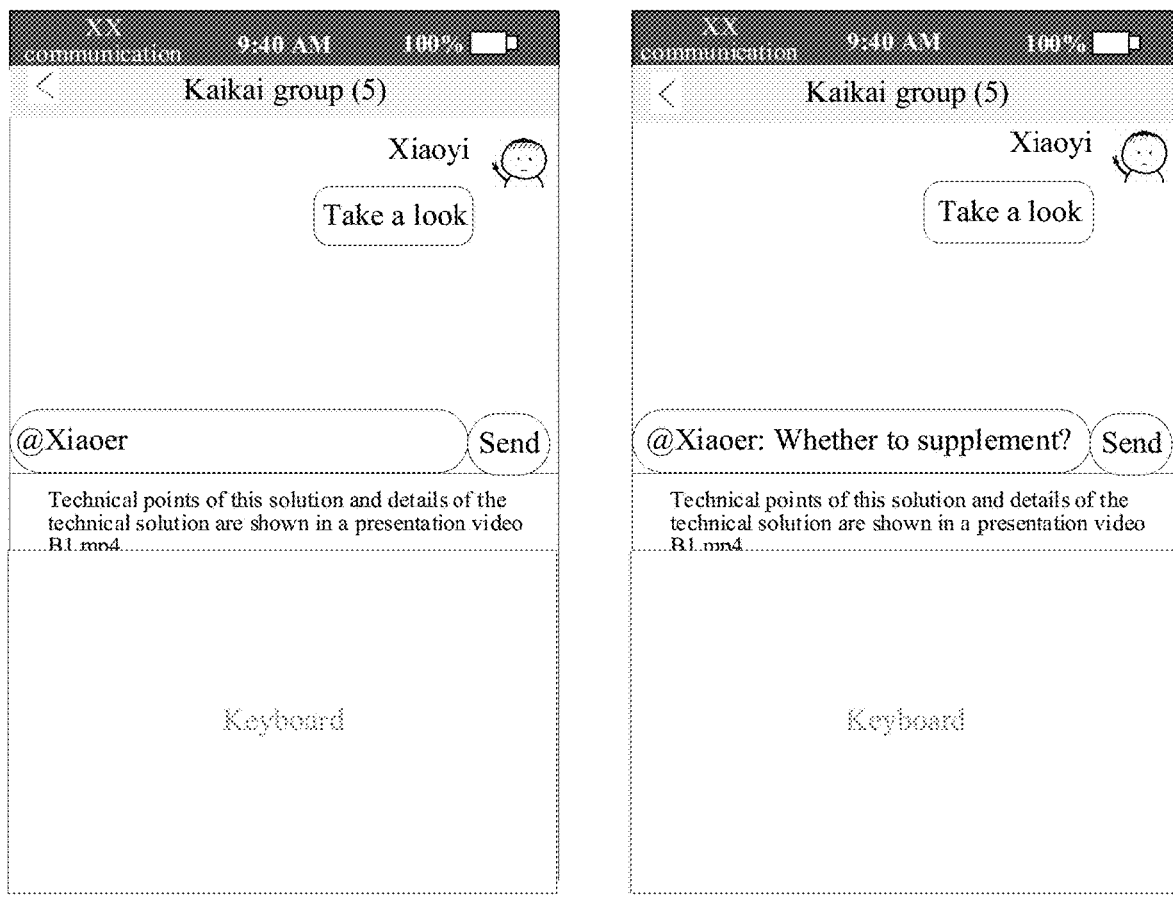
FIG. 10 is an exemplary diagram of some other page operations of a file commenting method according to an embodiment of this disclosure.

For example, referring to FIG. 10, the commenting object Xiaoyi specifies Xiaoer as the target object, and the comment editing content "whether to supplement?" of the target content is displayed.

In step 203, a session page of a commenting object (i.e., commentor) is displayed in response to a determination that the commenting operation performed on the target content is completed, where the session page includes a comment message of the target file that is sent by the commenting object, and the comment message includes the target content, the comment content, and a file identifier of the target file.

On the session page of the instant messaging client, an object (e.g., user) may perform operations such as information viewing and information editing and sending, to facilitate communication between objects (e.g., users) included on the session page. The form of information is a message on the session page. According to different forms of information, messages may be divided into different types, such as a text message and a picture message.

A comment message is a type of message and may include comment content, target content to which the comment content is directed, and a file identifier of a target file of the target content and may further include location description of the target content in the target file. When sending a comment message, the comment message may be sent in one message, or may be sent in multiple messages. For example, the target content and the comment content are separated from each other, and the comment message is sent in two messages.

The file identifier and the file are in a one-to-one correspondence. The file identifier may indicate the file, and may have multiple forms and may be a character such as a text or a digit, or may be a picture including a part of file content, or may be formed with the help of a color, a font size, and an audio/video effect.

When it is detected that the commenting operation performed on the target content is completed, the session page of the commenting object is displayed. The session page includes the comment message sent by the commenting object. When the commenting object completes the commenting operation, the comment message may be sent automatically by the client or sent manually by the commenting object. The comment message includes the comment made by the commenting object on the target content on the file content page, and the file identifier of the target file of the comment. After opening the session page, another object in the session may directly view the comment message to learn of the view of the commenting object on the target content of the target file. If the comment needs to be further appreciated with reference to the file content, a determining operation may be performed on the comment message, for example, the comment message is clicked, and the file content page is displayed to view the file content and the target content.

For example, referring to FIG. 3, when it is detected that Xiaoyi completes the commenting operation on the target content, the comment message is sent by the commenting object Xiaoyi. The comment message includes the file identifier "technical solution B.doc", the target content "this solution", and the comment content "whether to supplement?"

In an embodiment, the comment editing control includes a comment editing sub-control and a comment determining sub-control, and the displaying the comment content of the target content based on an editing operation performed on the comment editing control may include the following step: based on an editing operation performed on the comment editing sub-control of the comment editing control, displaying the comment content of the target content.

In this case, the displaying a session page of the commenting object in response to a determination that the commenting operation performed on the target content is completed may include the following step: determining that the commenting operation performed on the target content is completed in response to detecting a triggering operation performed on the comment determining sub-control, and displaying the session page of the commenting object.

Figure 9:
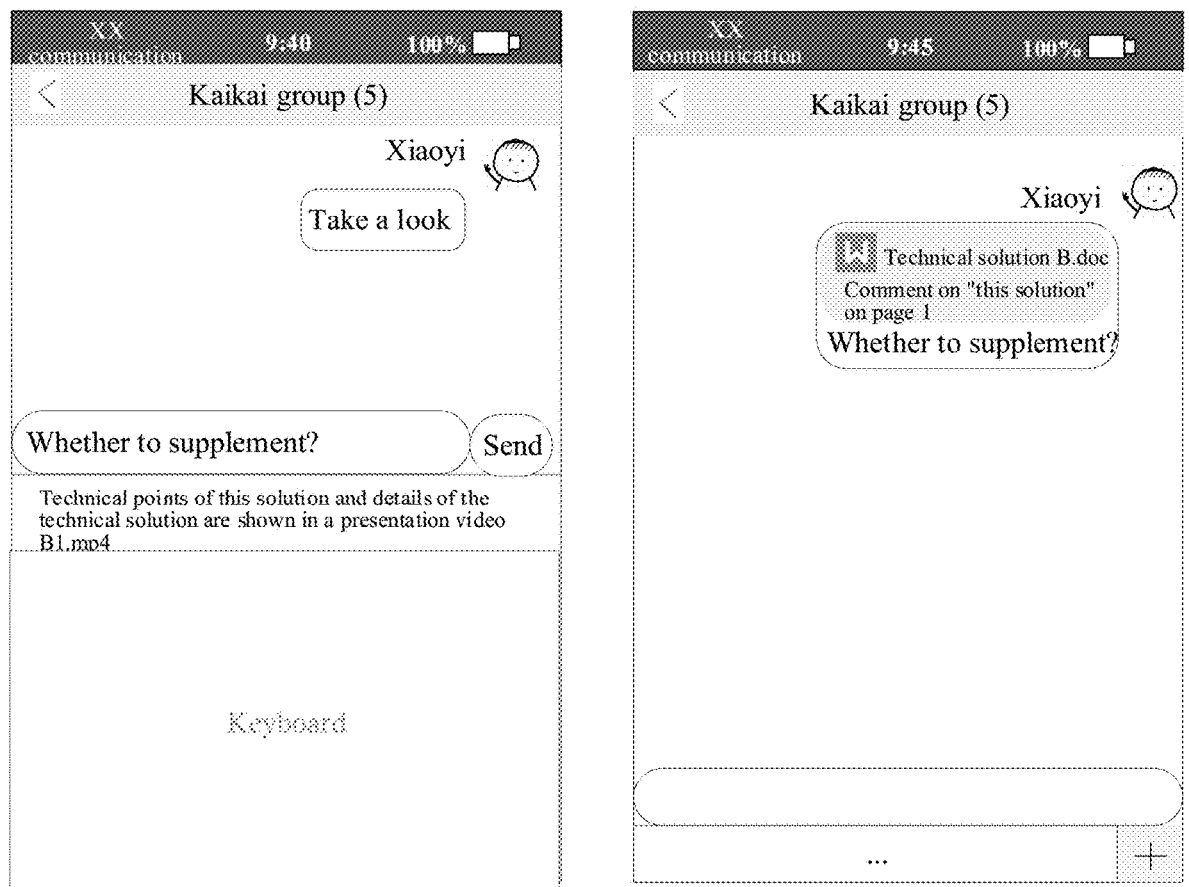
FIG. 9 is an exemplary diagram of some other page operations of a file commenting method according to an embodiment of this disclosure.

For example, referring to FIG. 9, the comment editing control is displayed as a comment editing sub-control (a rectangular input box that includes editing content "whether to supplement?" in FIG. 9) and a comment determining sub-control (a "sending" button in FIG. 9). When Xiaoyi triggers the "sending" button (that is, the comment determining sub-control), it may be determined that Xiaoyi completes a commenting operation on the target content, and a session page of the commenting object Xiaoyi is displayed, where the session page includes a comment message.

In an embodiment, the displaying a session page of a commenting object in response to a determination that the commenting operation performed on the target content is completed may include displaying a file content page in response to a determination that the commenting operation performed on the target content is completed, where the file content page includes the file content of the target file, a comment identifier of the target content, and a session display control; and switching, in response to detection of a triggering operation performed on the session display control, to displaying the session page for displaying to the commenting object (e.g., commentor).

The comment identifier may be used to mark the target content on the file content page to highlight the target content, to remind a viewing object to pay attention to the target content when browsing the file content. The comment identifier may have multiple forms. The target content may be differently displayed in color, a label may be set for the target content, an area corresponding to the target content may be increased or reduced, the target content may be repeatedly displayed, the target content may be quickly or slowly displayed, or the like.

The file content page is displayed, and the target content selected by the commenting object is highlighted through the comment identifier. In this case, the commenting object may view the display effect of the commenting operation on the file content page, and may further view comment content through the determining operation performed on the comment identifier. In addition, a session page returning control is set on the file content page. When triggering the session page returning control, the commenting object may return to the session page, and view a comment message that is already sent and that includes the comment content already provided.

Figure 11:
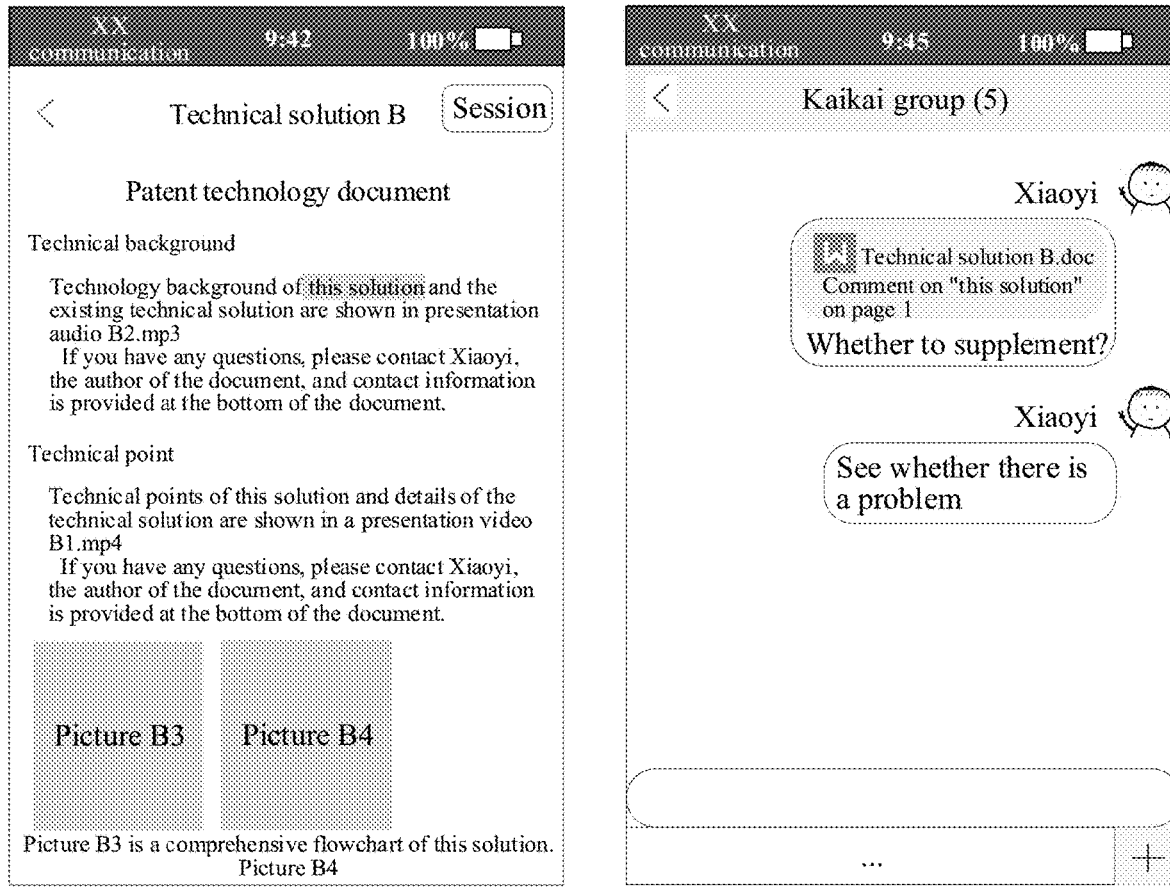
FIG. 11 is an exemplary diagram of some other page operations of a file commenting method according to an embodiment of this disclosure.

For example, referring to FIG. 11, when it is detected that Xiaoyi completes the commenting operation on the target content, a file content page is displayed, and the target content "this solution" is highlighted on the file content page by adding gray to the target content. An upper right corner of the file content page includes a session button. When a triggering operation performed by Xiaoyi on the session button is detected, the session page of Xiaoyi is displayed. The session page includes the comment message of Xiaoyi, and Xiaoyi may edit and send another message on the session page, such as a text message "see whether there is a problem" displayed on the session page.

For example, a user receives a file message, and the session page of the instant messaging client of the user includes the file message. The user clicks on the file message, and the instant messaging client displays the file content page. The file content page includes the file content of the target file corresponding to the file message, and the user selects the target content from the file content. The client displays a commenting button of the target content, the user clicks on the commenting button, the client displays the session page, and the user enters the comment content of the target content on the editing control of the session page. The session page may display in real time the comment content entered by the user. After completing entering of the comment content, the user may click on an editing completing confirmation button on the session page to complete an editing operation on the target content. Then, the client may add a comment identifier to the target content of the file content, and display the file content page. In this case, the user may click on the session display control on the file content page, and the client displays the session page. The session page includes the comment message of the target file. The comment message may include the file identifier of the target file, the target content, and the comment content.

In the embodiments of this disclosure, a file content page of an instant messaging client is displayed, where the file content page includes file content of a target file; comment content directed to target content is displayed based on a commenting operation performed on the target content of the file content; and a session page of a commenting object is displayed in response to a determination that the commenting operation performed on the target content is completed, where the session page includes a comment message of the target file that is sent by the commenting object, and the comment message includes the target content, the comment content, and a file identifier of the target file. In this embodiment, when the commenting operation is completed, the comment message including the file identifier of the target file, the target content, the comment content, and the commenting object is displayed on the session page of the instant messaging client, which is different from the related art in which a file corresponding to a file identifier needs to be opened and then a comment is viewed. Therefore, this embodiment can effectively simplify steps and improve the viewing efficiency.

Figure 12:
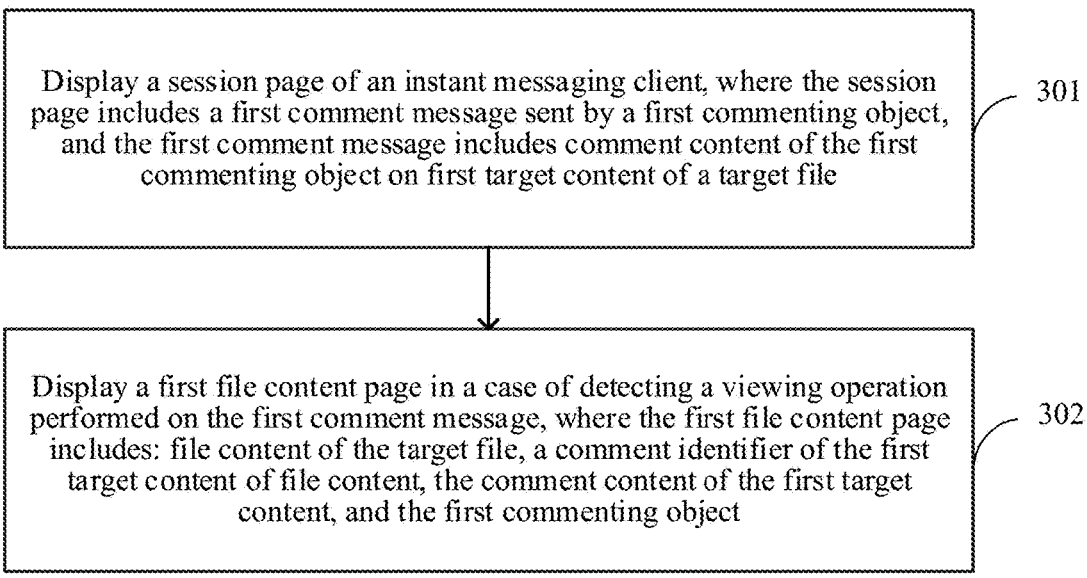
FIG. 12 is a schematic flowchart of a comment viewing method according to an embodiment of this disclosure.

An embodiment of this disclosure provides a comment viewing method. The method may be integrated and implemented in a terminal installed with a processor. As shown in FIG. 12, a specific procedure of the comment viewing method may be as follows:

In step 301, a session page of an instant messaging client is displayed, where the session page includes a first comment message sent by a first commenting object (e.g., first commentor), and the first comment message includes comment content of the first commenting object on first target content (e.g., a first portion) of a target file.

The file in this embodiment of this disclosure may be a virtual file stored on a computer device (such as a terminal or a server). The file may include a particular amount of information and occupy a particular storage space on the computer device. The file carries a file identifier, the file identifier and the file are in a one-to-one correspondence, and a file type may be determined based on the file identifier.

The target file is a file displayed on the file content page, and the file content of the target file may be all or a part of an amount of information included in the target file. For example, if the target file is opened based on a network address, the file content may be file content of the file corresponding to the network address, or may be attribute information of the file, or may be a comment on the file or the file content. If the file content of the target file has multiple forms, the file content may be one or more forms of the target file. For example, if the target file is an audio file, file content corresponding to the audio file may include audio, may include audio and text information in the audio, and may include waveforms of the audio.

On the session page of the instant messaging client, an object (e.g., user) may perform operations such as information viewing and information editing and sending, to facilitate communication between objects (e.g., users) included on the session page. The form of information is a message on the session page. According to different forms of information, messages may be divided into different types, such as a text message and a picture message.

A comment message is a type of message and may include comment content, target content to which the comment content is directed, and a file identifier of a target file of the target content and may further include location description of the target content in the target file. When sending a comment message, the comment message may be sent in one message, or may be sent in multiple messages. For example, the target content and the comment content are separated from each other, and the comment message is sent in two messages.

The comment message corresponds to the target content, and the target content may be a subset of the file content of the target file and is a portion selected by the commenting object (e.g., commentor) from the file content.

If a session includes at least one file, during a commenting and/or viewing operation, content may be selected from the at least one file in the session and a file of the selected content is the target file. The target file may be a file of target content selected from file content when the file content is commented, or may be a file of target content included in a selected comment message when the comment message is viewed. A commenting or viewing operation is performed based on the target file.

The comment content is a comment made by the commenting object on the target content. The form of the comment content is not limited and may be a text, a character (a character set including at least one single character or a character set such as a network address or an emoticon), an emoji, a picture (a static picture or a dynamic picture), a small video, or the like. This may be autonomously set according to the characteristic of the client and an actual scenario.

On the session page of the instant messaging client, comment content of the commenting object on a target text of the target file may be viewed through the comment message without opening the file content of the target file, effectively improving the efficiency of viewing the comment of the file content by the object (e.g., a user) in an instant messaging scenario. In addition, an object may further obtain the comment of the commenting object on the file content in time, and all objects in the session may comment on the file content of the target file as commenting objects. In addition, comments of different commenting objects are concisely displayed on the session page in time directly in the form of comment messages, further improving the communication efficiency.

The first comment message may be a comment message sent by a first commenting object, and there is at least one first comment message. First target content is a part of file content selected by the first commenting object from the file content, and the first commenting object provides at least one piece of comment content on the first target content. In addition, the first commenting object may further select other target content from the file content and comment on the other target content.

Figure 13:
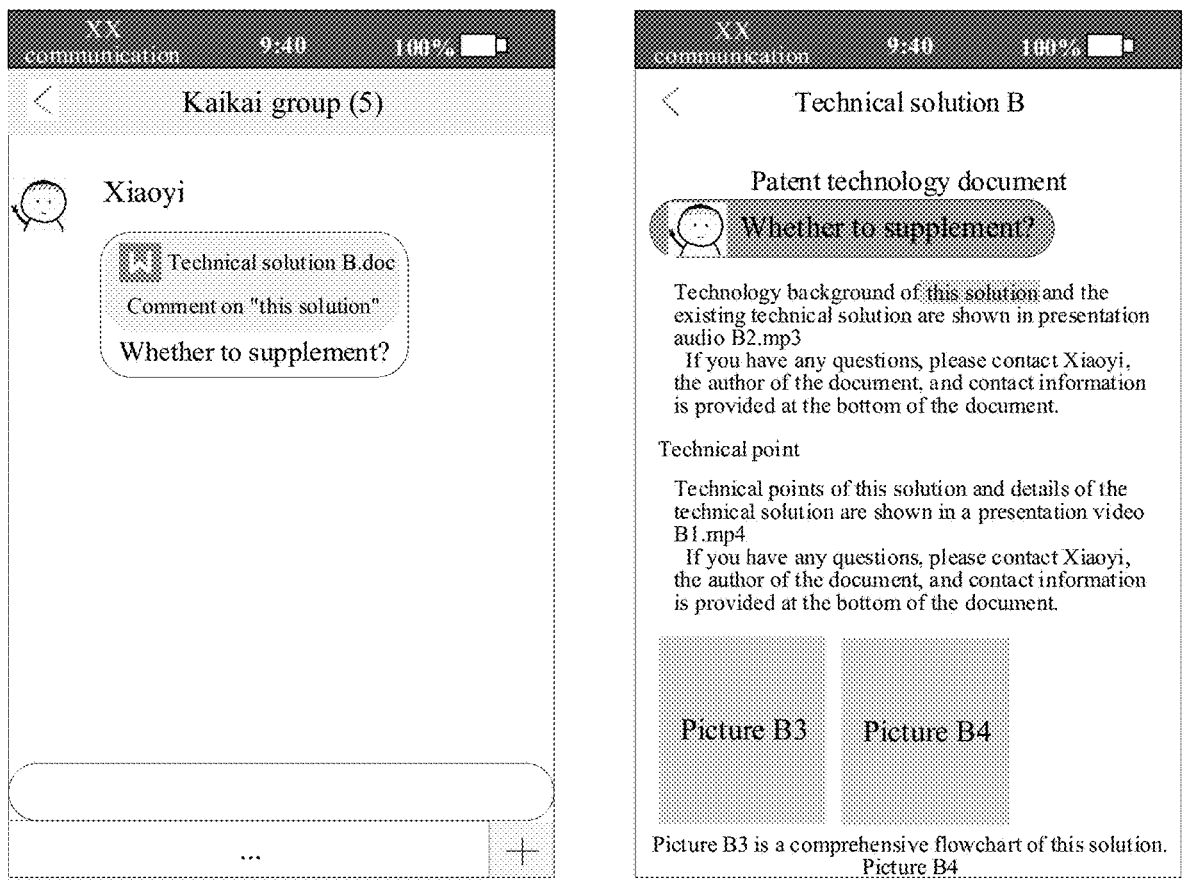
FIG. 13 is an exemplary diagram of a page operation of a comment viewing method according to an embodiment of this disclosure.

For example, FIG. 13 displays a session page of a group chat "kaikai group (5)" of an instant messaging client. The session page includes a first comment message sent by a commenting object Xiaoyi. The first comment message includes comment content "whether to supplement?", the first target content "this solution", a comment identifier "technical solution B.doc", and a nickname "Xiaoyi" and a profile picture of the first commenting object.

In step 302, a first file content page is displayed in a case of detecting a viewing operation performed on the first comment message (i.e., in response to detection of the viewing operation performed on the first comment message, the first file content page is displayed), where the first file content page includes: file content of the target file, a comment identifier of the first target content of file content, the comment content of the first target content, and the first commenting object.

The file content page may display the file content. The type of the file content may be character, picture, audio/video, or the like. When the file content page displays file content, adjustment may be made for different types. The file content may be displayed on a split screen, or the file content currently displayed on the file content page may be adjusted based on a user operation such as enlarging and jumping. For example, if the file content page displays a picture, based on a display enlarging operation performed by a user on the picture, the file content page may display an enlarged partial area of the picture.

The comment identifier may be used to mark the target content on the file content page to highlight the target content, to remind a viewing object to pay attention to the target content when browsing the file content. The comment identifier may have multiple forms. The target content may be differently displayed in color, a label may be set for the target content, an area corresponding to the target content may be increased or reduced, the target content may be repeatedly displayed, the target content may be quickly or slowly displayed, a particular character may be added to the target content, or the like.

A first file content page is displayed in response to detection of a viewing operation performed on the first comment message, where the first file content page includes: file content of the target file, a comment identifier of the first target content of file content, the comment content of the first target content, and identification of the first commenting object (i.e., the commentor that generated the comment content).

The viewing operation performed on the first comment message may be flexibly set in an application scenario according to different devices and operation manners, which is not limited herein. After the viewing operation is detected, the first file content page is displayed. Elements displayed on the first file content page correspond to the first comment message, that is, the first target content is highlighted through the comment identifier, and then the first commenting object and the comment content of the first target content are displayed. In this case, the viewing object may intuitively and quickly view the comment directly based on the highlighting effect without searching for the comment from all comment content included in the file content, effectively improving viewing efficiency.

When the first commenting object is displayed, an object identifier such as a profile picture, a nickname, or a user name of the first commenting object may be displayed. The first commenting object and the comment content of the first target content may be displayed in a group, to determine the commenting object and the comment content of the comment, helping to understand the comment.

For example, referring to FIG. 13, when the viewing object touches an area corresponding to the comment message sent by Xiaoyi on the touch screen (that is, performs the viewing operation on the first comment message), the file content page may be displayed. Content corresponding to the comment message is highlighted on the file content page, as shown in FIG. 13, including: turning the area of the target content "this solution" to gray (that is, the comment identifier of the first target content). The comment content "whether to supplement?" and the commenting object (a profile picture is a little person) are displayed above the target content.

In an embodiment, the displaying a first file content page in response to detection of a viewing operation performed on the first comment message may include determining an initial file based on a viewing operation performed on the first comment message and obtaining comment information of the initial file. The comment information includes location information (i.e., location of a portion of content within the initial file), commenting object information (i.e., identification of the commentor), and comment content information. Target content of the initial file is determined based on the location information, a comment identifier of the target content and comment content and a commenting object of the target content are added to file content of the initial file, to obtain a target file, and the first file content page is displayed. The first file page includes the file content of the target file.

The comment message and the initial file are in a one-to-one correspondence and determining the first comment message is determining the initial file. The initial file includes several pieces of comment information. The comment information may be comment content provided by the commenting object on a part of file content (that is, the target content) of the initial file. The target content corresponds to particular location information in the file content of the initial file. To store file comment information conveniently, location information of the target content is actually stored. Therefore, comment information may further be the commenting object and the location information of the target content within the target file. The comment information may be stored locally, may be stored online in the cloud, may be stored in a network device such as a server, or the like.

The file content has different forms. The location information may have different forms during storage, and may be a start value corresponding to a start location that records the target content, and a value offset of an end value at the end of the target content relative to the start value of the start location; may be a data set consisting of a value or a value pair at a location corresponding to each minimum unit of the target content, or the like. The target content is determined according to the file content and the location information, and is differently displayed in the initial file (that is, the comment identifier of the target content is added). A label including the comment content and the commenting object is added for the target content. The label may have multiple forms, and may be a screenshot corresponding to the comment message, may be a dynamic bubble or a static bubble, may be an annotation, or the like.

In an embodiment, the first file content page further includes: a comment identifier of at least one piece of second target content; and the comment viewing method may include displaying comment content of the second target content in response to detection of a viewing operation performed on the comment identifier of the second target content, where the comment content of the second target content includes: at least one of (i) comment content of the first commenting object (e.g., a first commentor) on the second target content or (ii) comment content of at least one second commenting object (e.g., a second commentor) on the second target content.

If the file content page includes the comment identifier of the second target content, when a viewing object wants to view the comment content of the second target content, this may be implemented by performing a viewing operation. When the viewing operation is detected, comment content provided by all commenting objects on the second target content may be displayed. The commenting object includes a first commenting object and a second commenting object. A number of second commenting objects, a number of comment content of the second target content, and a number of the second target content are all at least one.

Figure 14:
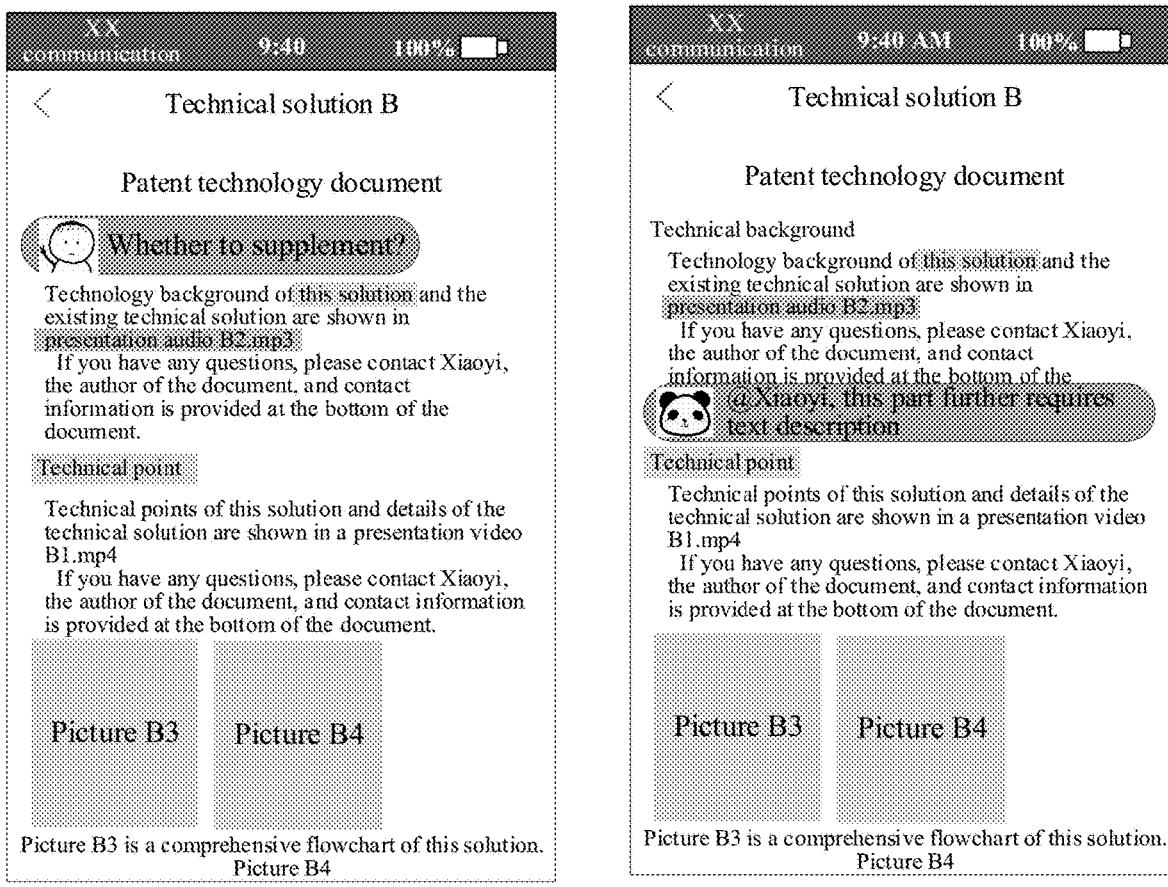
FIG. 14 is an exemplary diagram of some page operations of a comment viewing method according to an embodiment of this disclosure.

For example, referring to FIG. 14, when a viewing object (e.g., a viewing user) performs a viewing operation on the second target content ("technical point"), the second commenting object (a profile picture is a bear) of the second target content and comment content ("@Xiaoyi: this part further requires text description") of the second commenting object on the second target content are displayed.

Figure 15:
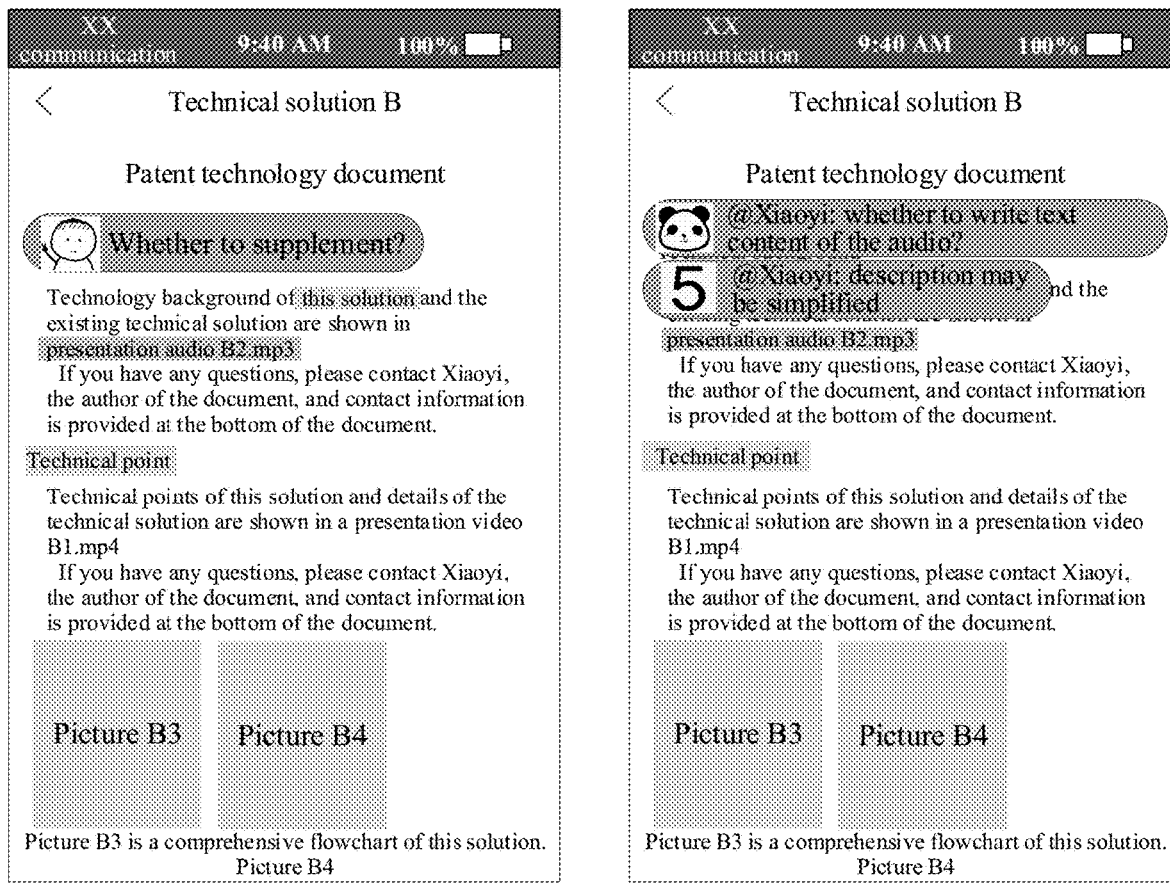
FIG. 15 is an exemplary diagram of some other page operations of a comment viewing method according to an embodiment of this disclosure.

In another example, referring to FIG. 15, when a viewing object performs a viewing operation on the second target content ("presentation audio B.mp3"), the second commenting object (a profile picture is a bear) of the second target content and comment content ("@Xiaoyi: whether to write text content of audio?") of the second commenting object on the second target content, and a third commenting object (a profile picture is a digit 5) of the second target content and comment content ("@Xiaoyi: description may be simplified") of the third commenting object on the second target content are displayed.

In an embodiment, the first file content page further includes: comment content of at least one second commenting object on the first target content; and the comment viewing method may include displaying the comment content of the second commenting object on the first target content and identification of the second commenting object on the first file content page in response to detection of a viewing operation performed on the comment message.

A number of second commenting objects and a number of comment content of the second commenting object on the first target content are both at least one.

Figure 16:
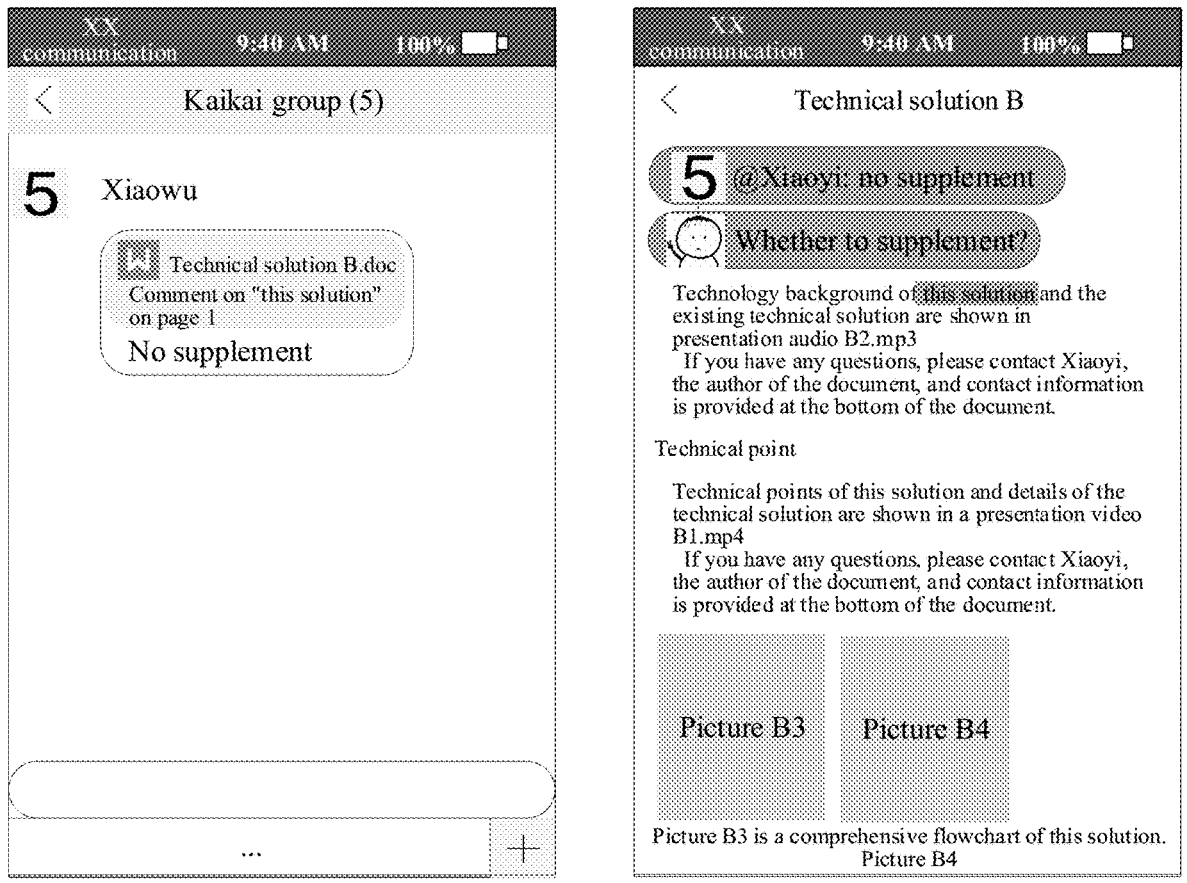
FIG. 16 is an exemplary diagram of some other page operations of a comment viewing method according to an embodiment of this disclosure.

For example, referring to FIG. 16, when a viewing operation performed by a viewing object on the first comment message is detected, the file content page is displayed, the area of the target content "this solution" is turned to gray (that is, the comment identifier), and the first commenting object (the profile picture is a little person) and the comment content of the first commenting object ("whether to supplement?"), and the second commenting object (the profile picture is the digit 5) and the comment content of the second commenting object ("@Xiaoyi, no supplement") are displayed.

In an embodiment, the first file content page includes an all-comment display control, and the comment viewing method may include displaying comment content of all commenting objects (e.g., all commentors) on all target content (e.g., all portions) on the first file content page in response to detection of a triggering operation performed on the all-comment display control.

In this embodiment of this disclosure, a control has various forms, such as an input box, an icon, and a button.

Figure 17:
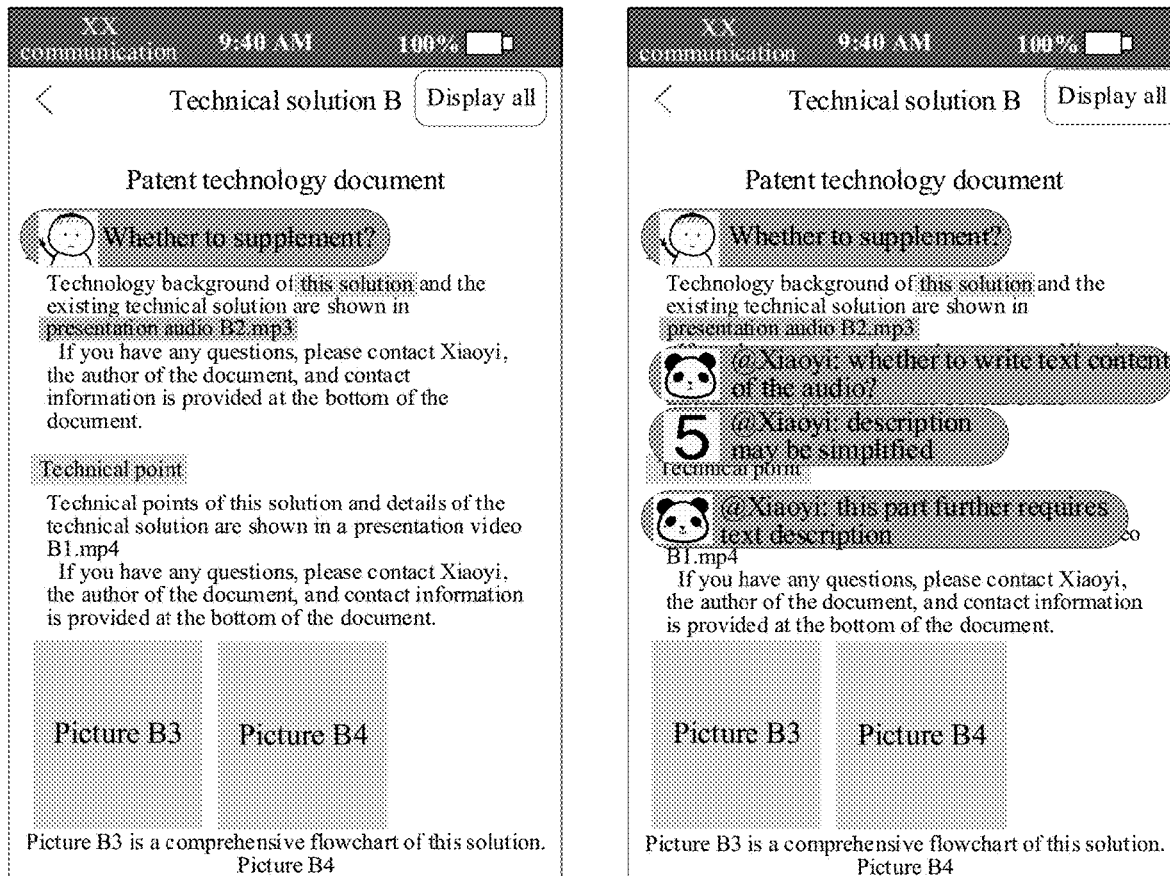
FIG. 17 is an exemplary diagram of some other page operations of a comment viewing method according to an embodiment of this disclosure.

For example, referring to FIG. 17, the all-comment display control is a "Display all" button, and the file content page includes the "Display all" button. When a triggering operation performed on the "Display all" button is detected, comment content of all commenting objects on all target content is displayed, that is, a second commenting object (the profile picture is a bear) of second target content and comment content ("@Xiaoyi: whether to write text content of the audio?") of the second commenting object on the second target content, another second commenting object (the profile picture is the digit 5) of second target content and comment content ("@Xiaoyi: description may be simplified") of the second commenting object on the second target content, a second commenting object (the profile picture is a bear) of another second target content and comment content ("@Xiaoyi: this part further requires text description") of the second commenting object on the second target content, and the first commenting object (the profile picture is a little person) and the comment content ("whether to supplement?") of the first commenting object are displayed.

In an embodiment, the comment viewing method may include hiding comment information of the target file in response to detection of a hiding operation performed on the first file content page.

According to different operations, the first file page displays several pieces of comment information. The comment information includes, but is not limited to, a commenting object, comment content, and a comment identifier of the target content. In different application scenarios, the comment information may be hidden according to an actual requirement, so that the comment information is not displayed on the first file content page.

In an embodiment, the comment information includes comment content and a commenting object, and the hiding comment information of the target file in response to detection of a hiding operation performed on the first file content page may include hiding comment content and a commenting object of the target file in response to detection of a comment content hiding operation performed on the first file content page.

The hiding operation performed on the comment content on the first file content page may be flexibly set according to system parameters, and may be forms such as sliding, slight touch, or a continuous click, may be an operation of triggering a preset control, or may be automatic hiding set by the background or by an object according to a setting entered by the object (e.g., user) based on conditions such as a time and an operation (for example, the object sets that after 5 seconds from the time of displaying the comment content and the commenting object, the comment content and the commenting object are automatically hidden, and in another example, the background sets that when a viewing operation performed by an object on a comment identifier of other target content is detected, the currently displayed comment content and commenting object are automatically hidden).

Figure 18:
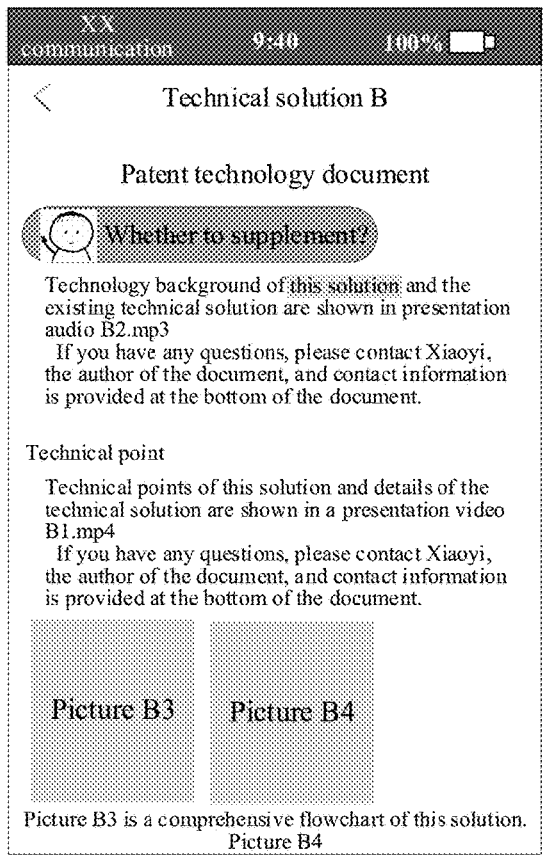
FIG. 18 is an exemplary diagram of some other page operations of a comment viewing method according to an embodiment of this disclosure.
Figure 18:
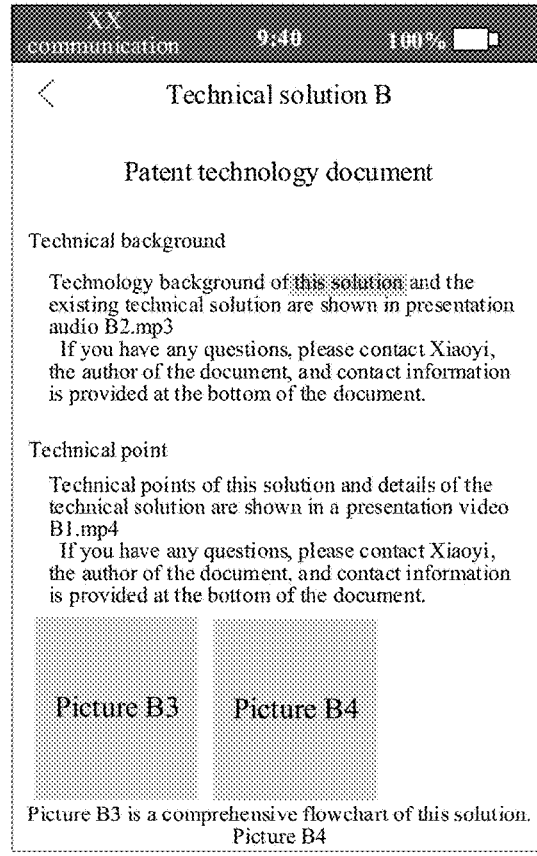

For example, referring to FIG. 18, an object (e.g., a user) slightly touches any area of the file content page corresponding to the screen, and the displayed commenting object (the profile picture is a little person) and the comment content ("whether to supplement?") of the commenting object are no longer displayed on the file content page.

In an embodiment, the comment information includes a comment identifier, and the hiding comment information of the target file in response to detection of a hiding operation performed on the first file content page may include displaying a comment identifier hiding control in response to detection of a selection operation performed on the first file content page; and hiding comment identifiers of all target content of the target file based on a triggering operation performed on the comment hiding control.

It should be noted that, when the hiding operation performed on the comment identifier corresponding to the commenting object and the comment content is detected, the commenting object and the comment content may be automatically hidden. The hiding operation performed on the comment identifier may be any operation that may hide the comment identifier, and includes a preset automatic operation or a manual operation performed by an object on a control or a specified action, or the like.

Figure 19:
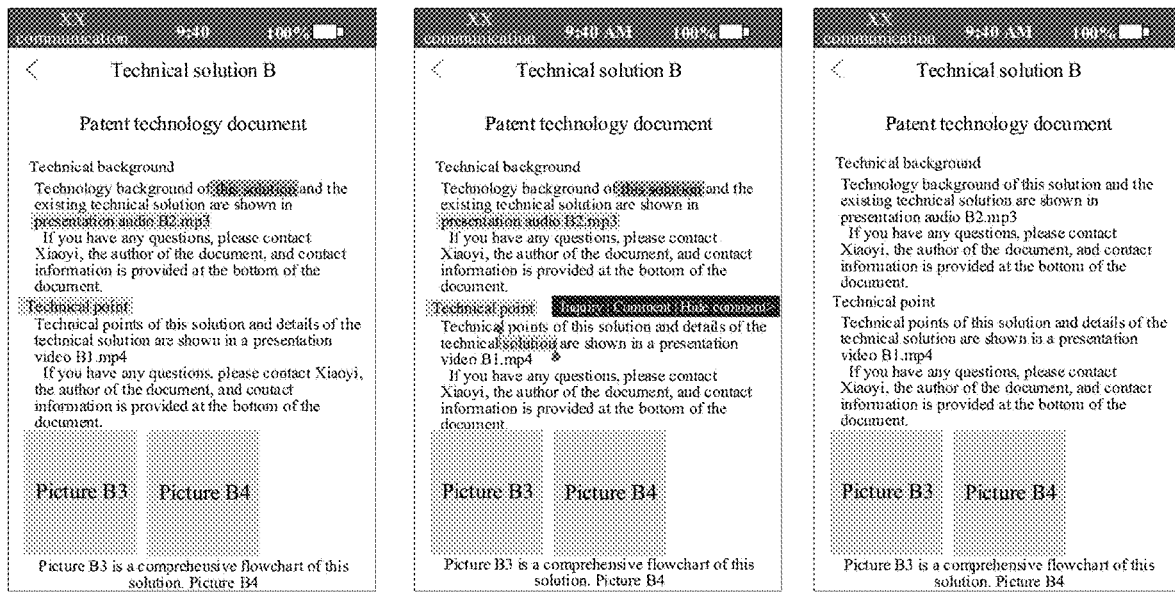
FIG. 19 is an exemplary diagram of some other page operations of a comment viewing method according to an embodiment of this disclosure.

For example, referring to FIG. 19, the file content page includes three comment identifiers, and highlighted target content is respectively "this solution", "presentation audio B2.mp3", and "technical point". For selection of any file content on the file content page, a "Hide comment" control may be displayed. Based on a triggering operation performed on the "Hide comment" control, a file content page that includes no comment identifier is displayed.

In an embodiment, the first file content page includes an all-identifier hiding control, the comment information includes a comment identifier, and the hiding comment information of the target file in response to detection of a hiding operation performed on the first file content page may include hiding comment identifiers of all target content of the target file in response to detection of a triggering operation performed on the all-identifier hiding control.

Figure 20:
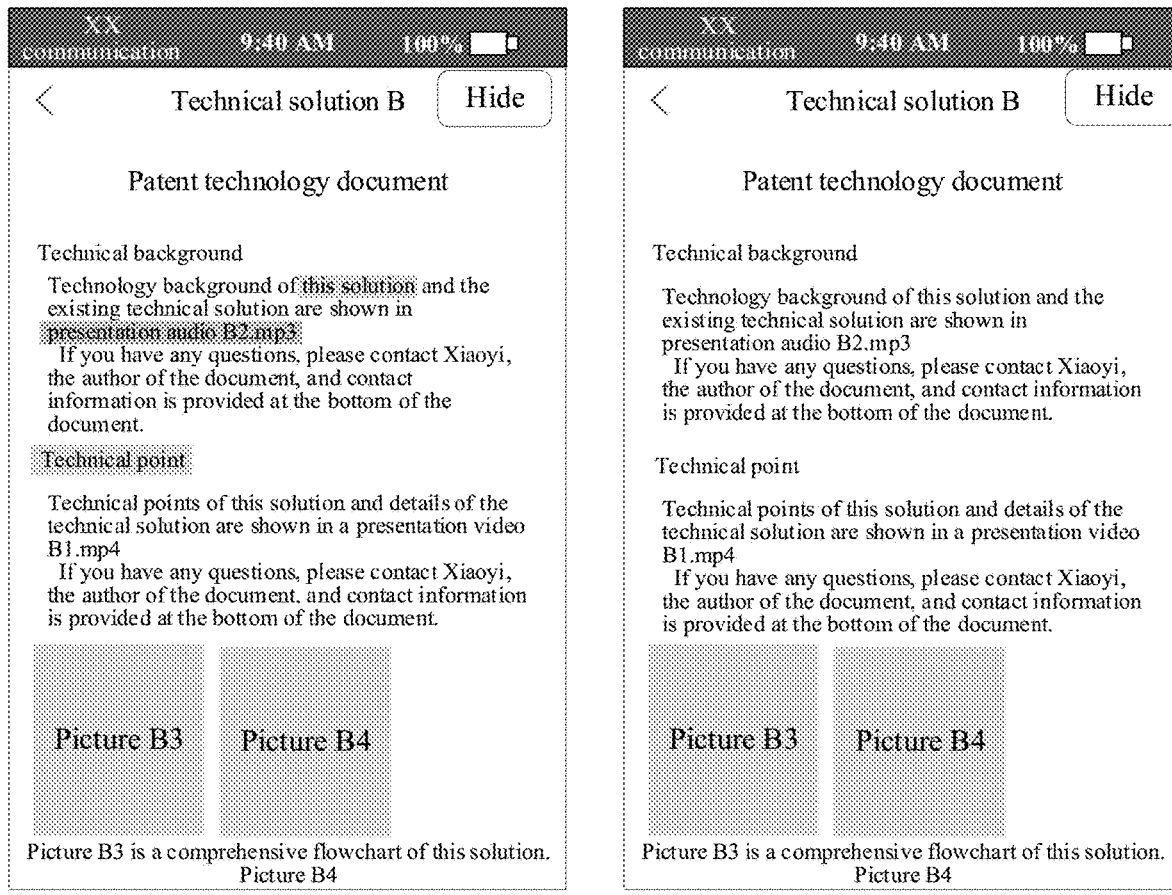
FIG. 20 is an exemplary diagram of some other page operations of a comment viewing method according to an embodiment of this disclosure.

For example, referring to FIG. 20, an all-identifier hiding control is a "Hide" button, and the file content page includes the "Hide" button. When a triggering operation performed on the "Hide" button is detected, comment identifiers of all target content of the target file are hidden, that is, comment identifiers of "this solution", "presentation audio B2.mp3", and "technical point" are hidden, and a file content page that includes no comment identifiers is displayed.

In an embodiment, the comment viewing method may include displaying comment identifiers of all target content of the target file in response to detection of a comment display operation based on the file content page.

The comment display operation on the file content page may have various forms, and may be a control, may be forms such as sliding, long press, slight touch, or a continuous click, may be automatic display set by the background or by an object according to a setting entered by the object based on conditions such as a time and an operation, or the like.

Figure 21:
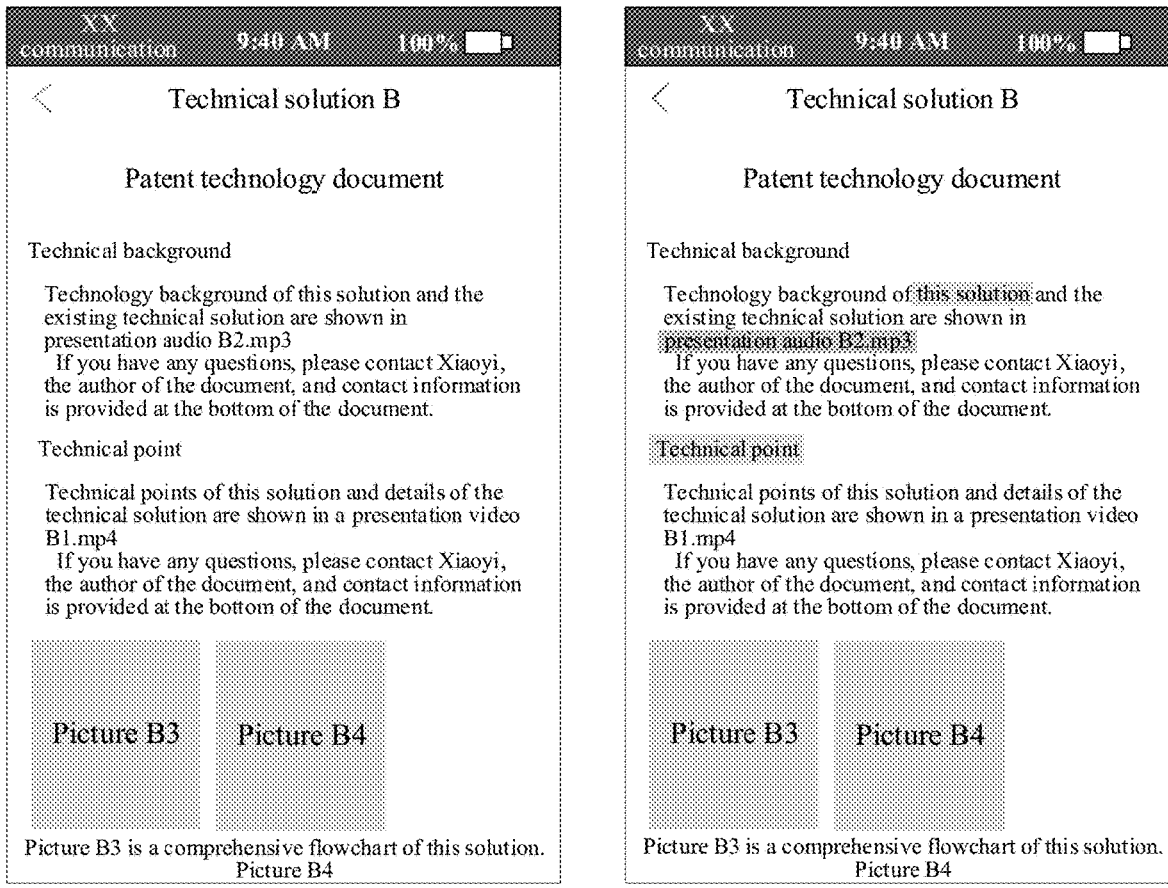
FIG. 21 is an exemplary diagram of some other page operations of a comment viewing method according to an embodiment of this disclosure.

For example, referring to FIG. 21, when a long-press operation performed on the file content page is detected, comment identifiers of all target content of the target file on the file content page are displayed, that is, comment identifiers of "this solution", "presentation audio B2.mp3", and "technical point".

In an embodiment, the file content of the target file includes first file content and second file content, the first file content page includes a page switching control, and the comment viewing method may include, in response to detection of a switching operation based on the page switching control, switching to display of a second file content page, where the second file content page includes the second file content (e.g., a second portion) of the target file, a comment identifier of a target content (e.g., the second portion) of the second file content, and comment content of a comment identifier of at least one piece of target content (e.g., comment content directed to the second portion of the target file).

A number of second file content pages may change according to properties of file content and a computer device. A number of second file content pages displayed after the page switching control is triggered may be 1 or may be flexibly set according to an actual requirement. The form of the page switching control may be a button, an input box, an icon, or the like, or may be a combination of several forms such as a combination of a button and an input box, or the like. In an application scenario, the form of the page switching control may be flexibly set according to factors such as an actual requirement or a number of second file content pages. In addition to the form of a control, another operation such as sliding the screen or pulling a progress bar may also implement page switching.

A number of comment content displayed on the second file content page may change according to a requirement. Comment content of all comment identifiers on the page may be displayed, particular comment content may be displayed, comment content corresponding to a particular commenting object may be displayed, or comment content of a particular location, such as comment content of first target content of the page, may be displayed. Different display types of comment content may be flexibly implemented through a control or in another manner, which is not described in detail herein.

Figure 22:
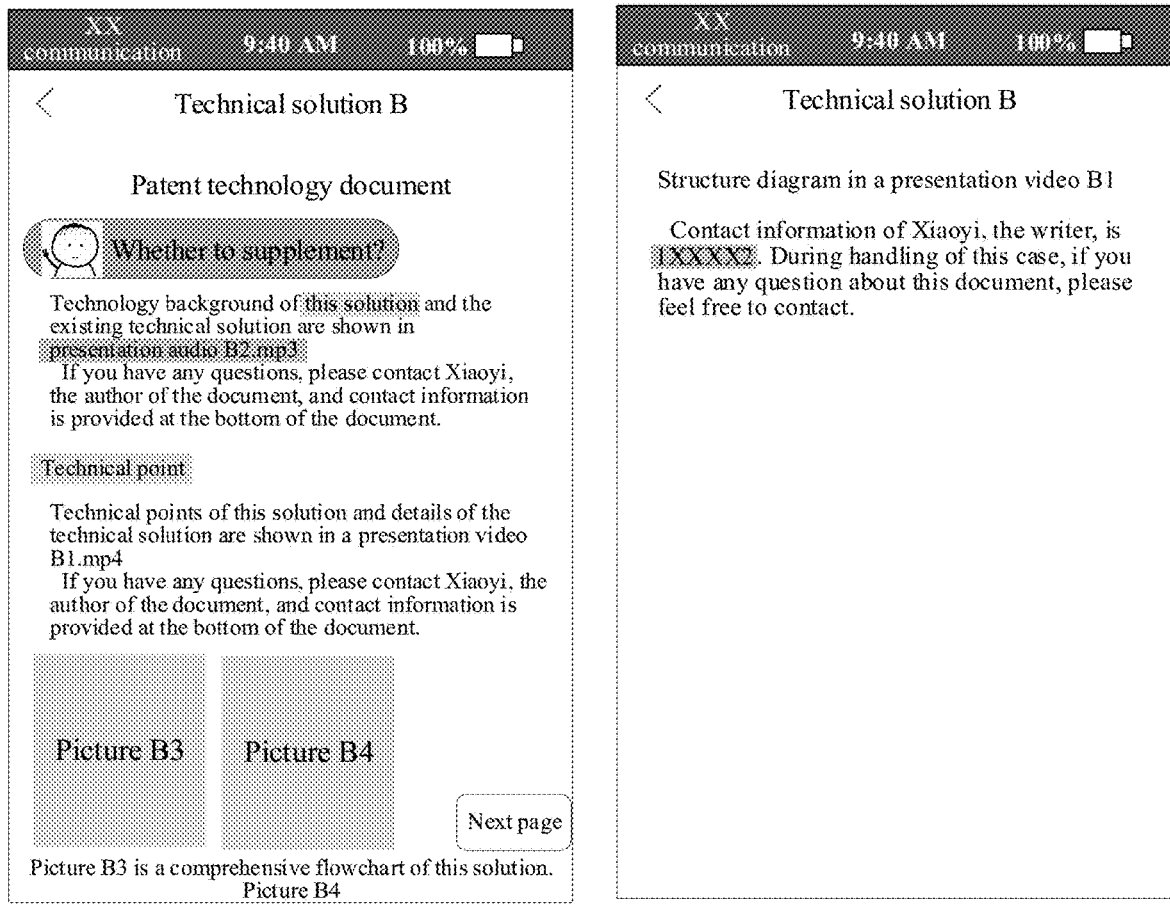
FIG. 22 is an exemplary diagram of some other page operations of a comment viewing method according to an embodiment of this disclosure.

For example, referring to FIG. 22, a number of second file content pages is 1, and the page switching control is a "Next page" button. When a triggering operation performed on the "Next page" button is detected on the first file content page, the second file content page may be displayed.

For example, the session page of the instant messaging client of the user includes several comment messages of a file. A user may click on a comment message, and the client displays the file content page of the target file corresponding to the comment message. The file content page displays the file content of the target file and several comment identifiers (one comment identifier corresponds to one piece of target content). In addition, the file content page further displays a comment identifier, comment content, and a commenting object of the target content corresponding to the comment message. The user may click on any comment identifier, and the client may display the comment content and the commenting object corresponding to the comment identifier. The user may also click on the all-comment display button on the file content page, and the client may display comment content and commenting objects corresponding to all comment identifiers.

For the commenting object and the comment content displayed on the file content page, the user may click on a file identifier. The client displays the comment hiding button, the user clicks on the comment hiding button, and the client may hide the comment content and the commenting object corresponding to the comment identifier. The user may click on a file identifier, the client may also display an identifier hiding button, the user clicks on the identifier hiding button, and the client hides the comment identifier. The file content page includes an all-comment hiding button, the user clicks on the all-comment hiding button, and the client hides all comment content and commenting objects displayed on the file content. The file content page includes an all-identifier hiding button, the user clicks on the all-identifier hiding button, and the client hides all comment identifiers displayed on the file content. The file content page includes an all-identifier display button, the user clicks on the identifier display button, and the client displays all file identifiers of the target file.

In this embodiment of this disclosure, a session page of an instant messaging client may be displayed, where the session page includes a first comment message sent by a first commenting object, and the first comment message includes comment content of the first commenting object on first target content of a target file. A first file content page is displayed in response to detection of a viewing operation performed on the first comment message, where the first file content page includes: file content of the target file, a comment identifier of the first target content of file content, the comment content of the first target content, and the first commenting object. In this embodiment, the first target content in the file content may be quickly positioned based on the first comment message on the session page and the comment identifier of the first target content, and the comment content and the first commenting object of the first target content are viewed. Different from the related art in which the file needs to be opened and each piece of target content is viewed in the file to determine the first target content, this embodiment can significantly simplify steps and improve the viewing efficiency.

According to the method described in the foregoing embodiments, the following further provides detailed description by using examples.

In this embodiment, for example, the first commenting apparatus is specifically integrated in a terminal, and the second commenting apparatus is specifically integrated in a server.

Figure 23:
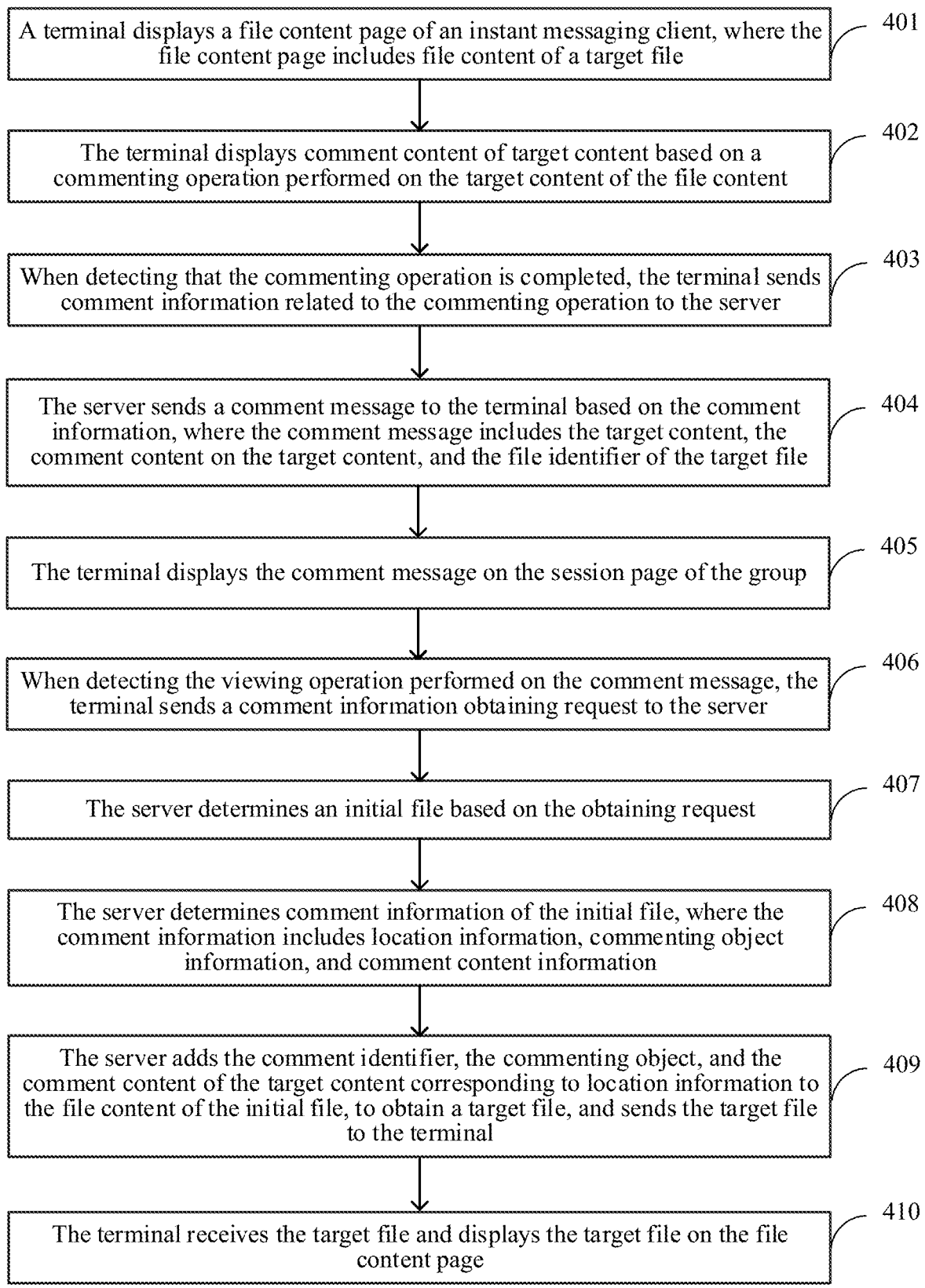
FIG. 23 is a schematic flowchart of a commenting method according to an embodiment of this disclosure.

As shown in FIG. 23, a specific procedure of a commenting method is as follows.

In step 401, a terminal displays a file content page of an instant messaging client, where the file content page includes file content of a target file.

Figure 24:
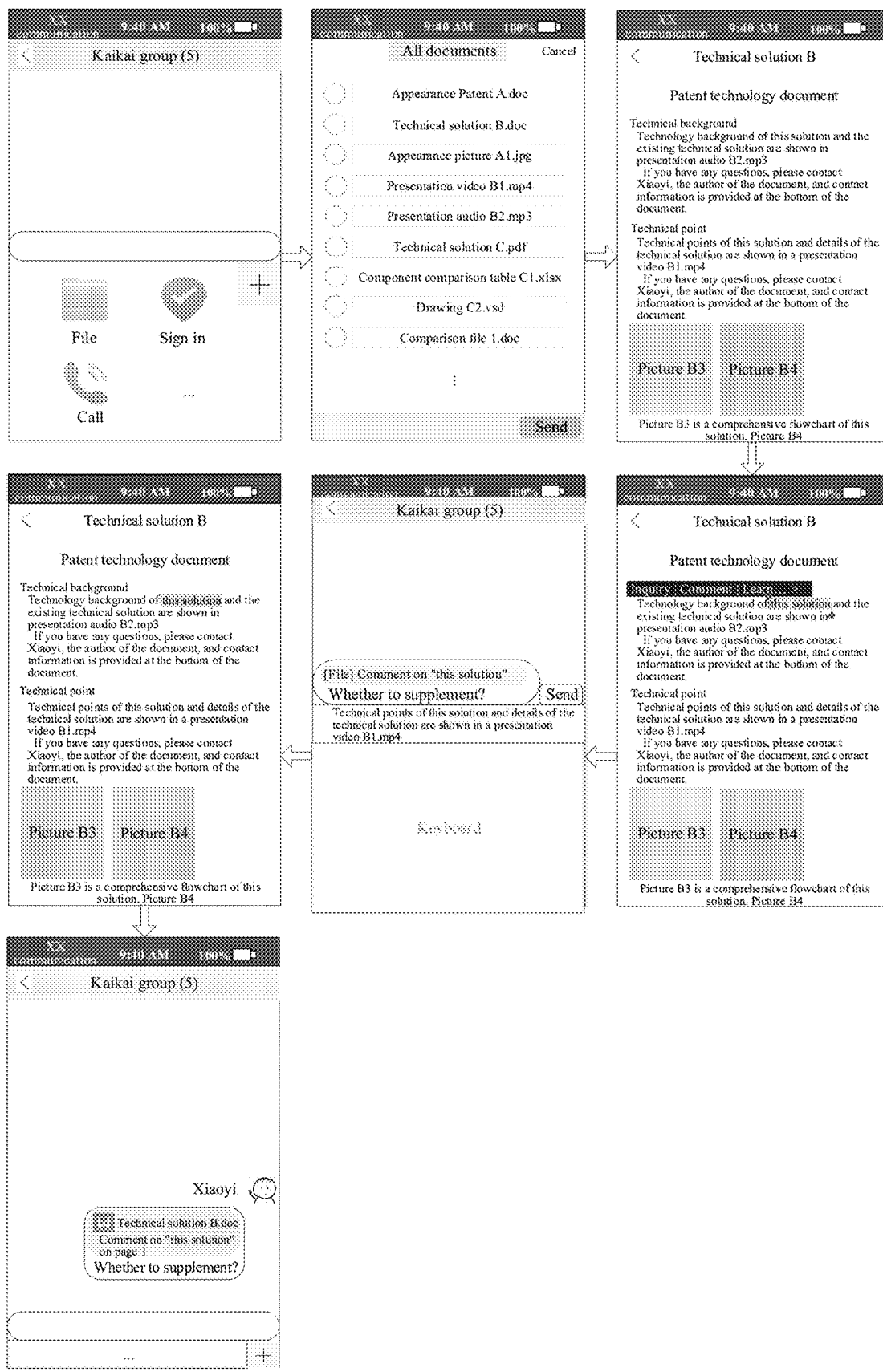
FIG. 24 is an exemplary diagram of page operations of a commenting method according to an embodiment of this disclosure.

For example, referring to FIG. 24, a session page of a group "kaikai group (5)" of user Xiaoyi includes a "file" button that may be used to upload a file to the group. After Xiaoyi triggers the "file" button, a file list page is displayed and includes several file identifiers. Based on the file identifiers, it may be determined that to-be-uploaded files include file types such as a video, audio, a table, a picture, and a document. After Xiaoyi selects a target file whose file identifier is "technical solution B.doc", the file content page is displayed and includes file content of the target file.

Figure 25:
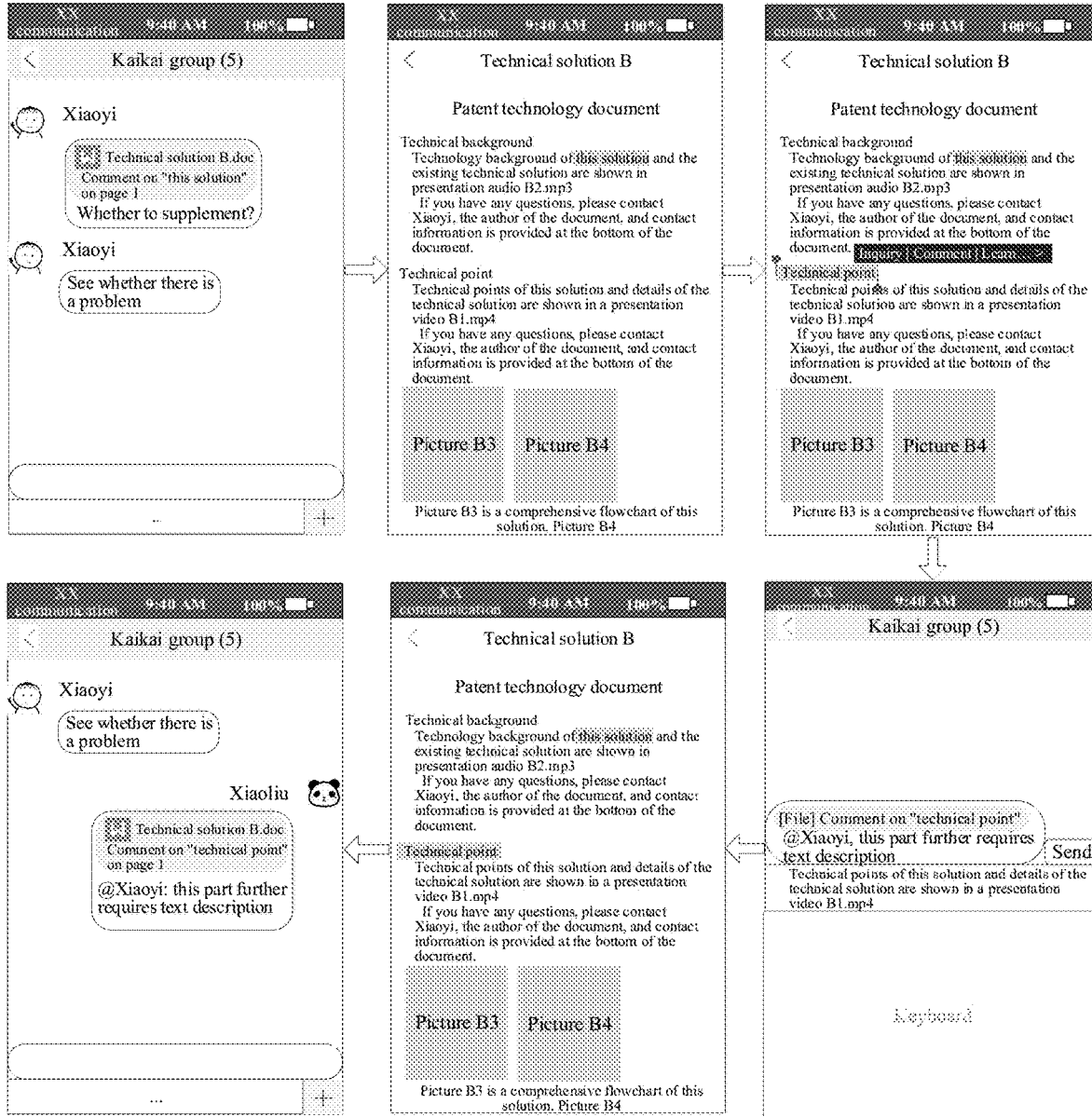
FIG. 25 is another exemplary diagram of page operations of a commenting method according to an embodiment of this disclosure.

In another example, referring to FIG. 25, a session page of the group "kaikai group (5)" of user Xiaoliu displays a comment message sent by the group member Xiaoyi. The comment message includes the file identifier "technical solution B.doc" of the file. After Xiaoliu selects the comment message, it may be determined that the file is the target file, and the file content page is displayed and includes the file content of the target file.

In step 402, the terminal displays comment content of target content based on a commenting operation performed on the target content of the file content.

For example, referring to FIG. 24, Xiaoyi selects the target content "this solution" on the file content page, and the file content page displays a "commenting" button. Xiaoyi triggers the "commenting" button, and a session page of Xiaoyi is displayed. The session page includes a history message display area that displays a history message of "kaikai group (5)", and further includes a comment content editing area that includes a comment editing box that may display comment content based on a commenting operation and a "send" button that may be used to indicate that a commenting operation of the target content is completed. The comment editing box displays the comment content "whether to supplement?" that is on the target content "this solution" and that is being edited.

In step 403, in response to a determination that the commenting operation is completed, the terminal sends comment information related to the commenting operation to the server.

For example, after Xiaoyi triggers the "sending" button, the terminal sends comment information such as the commenting object "Xiaoyi", the comment content "whether to supplement?", the target content "this solution", and the file identifier "technical solutions B.doc" of the target file to the server.

In step 404, the server sends a comment message to the terminal based on the comment information, where the comment message includes the target content, the comment content on the target content, and the file identifier of the target file. In an embodiment, the server may send the comment message to terminals of all group members of "kaikai group (5)".

The comment message may include a nickname and a profile picture of the commenting object, the file identifier of the target file, a location of the target content in the file content, the target content, and the comment content.

For example, the file identifier of the target file is "technical solution B.doc". The location of the target content in the file (i.e., the page number within the file), the target content, the comment content, and the nickname of the commenting object may correspondingly be included in the following exemplary comment messages.

Page 1: this solution, whether to supplement?, and Xiaoyi;

Page 1: technical point, @ Xiaoyi: this part further requires text description, and Xiaoliu;

Page 1: presentation audio B2.mp3, @ Xiaoyi: whether to write text content of audio?, and Xiaoliu;

Page 1: this solution, @ Xiaoyi: no supplement, and Xiaowu; and

Page 2: 1XXXX2, @ Xiaoyi: one number is lost, and Xiaoliu.

In step 405, the terminal displays the comment message on the session page of the group.

For example, referring to FIG. 24, after Xiaoyi completes the commenting operation, the file content page is displayed, and the target content "this solution" of the page is differently displayed by adding gray. Group members of "kaikai group (5)" including Xiaoyi may view the target content "this solution" more quickly on the file content page. In an embodiment, after the commenting operation is complete, the page automatically switches to display a session page of "kaikai group (5)" after 5 seconds and the session page includes the comment message sent by Xiaoyi. The comment message includes a nickname (Xiaoyi) and a profile picture (a little person) of the commenting object, the file identifier "technical solution B.doc" of the target file, a location "page 1" of the target content in the file content, the target content "this solution", and the comment content "whether to supplement?".

In step 406, in response to detection of the viewing operation performed on the comment message, the terminal sends a target file obtaining request to the server.

For example, referring to FIG. 25, when a viewing operation (the viewing operation may be clicking on the comment message) performed by Xiaoliu on the comment message of Xiaoyi is detected, the terminal sends the target file obtaining request to the server.

Figure 26:
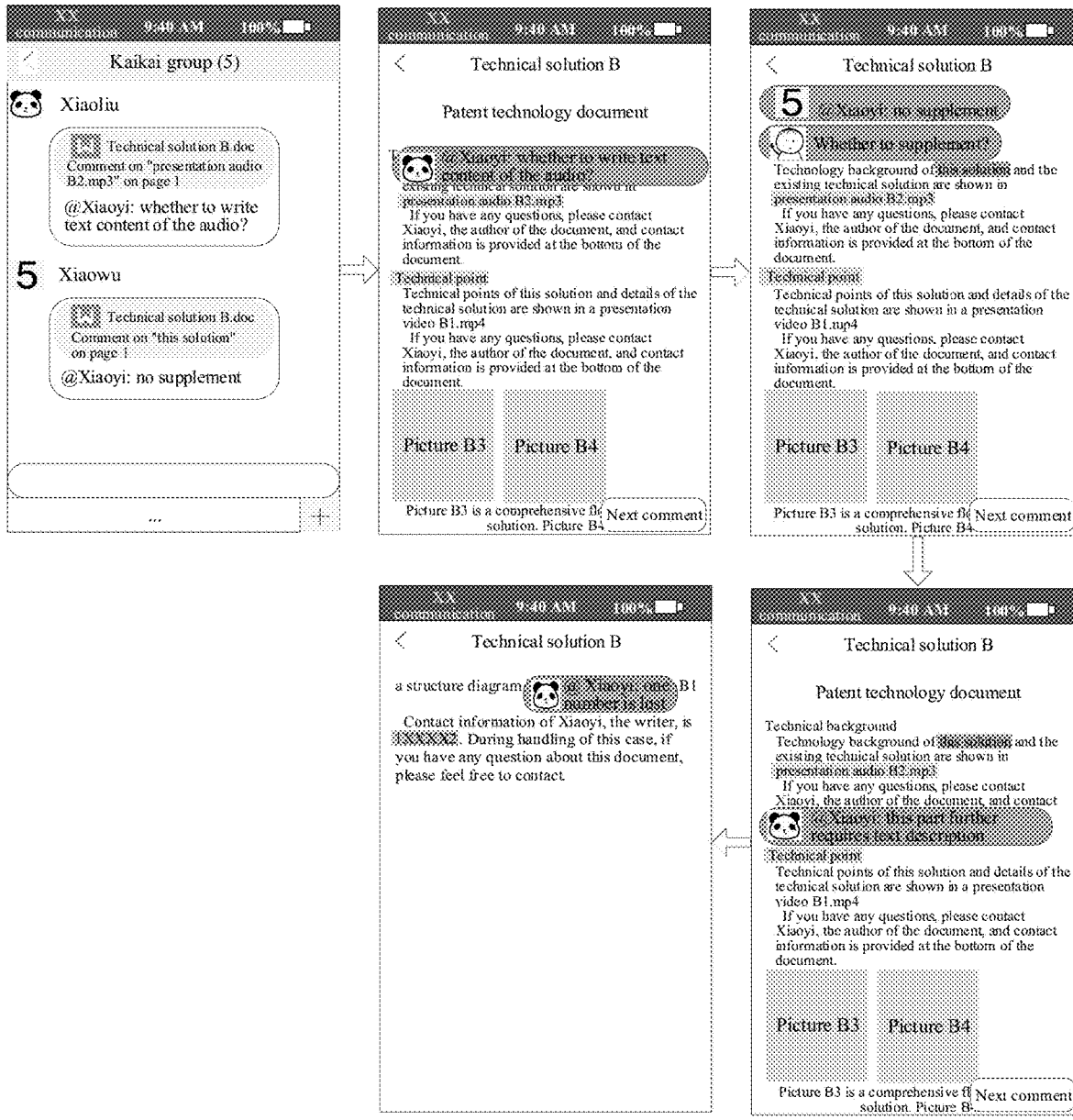
FIG. 26 is another exemplary diagram of page operations of a commenting method according to an embodiment of this disclosure.

In another example, referring to FIG. 26, in response to detection of the viewing operation performed by Xiaosi on the comment message of Xiaoliu, the terminal sends a target file obtaining request to the server.

Figure 27:
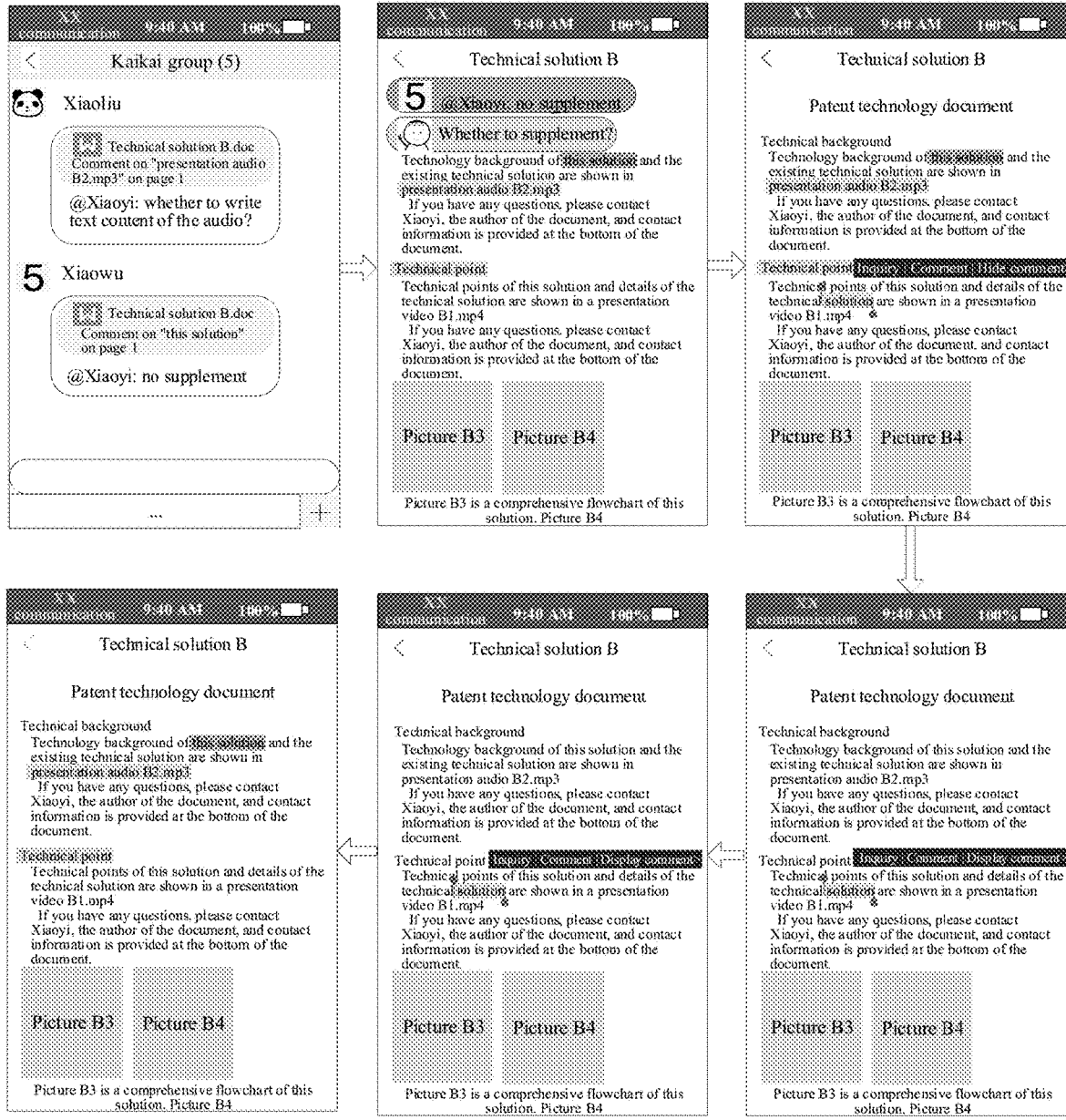
FIG. 27 is another exemplary diagram of page operations of a commenting method according to an embodiment of this disclosure.

In another example, referring to FIG. 27, in response to detection of the viewing operation performed by Xiaosi on the comment message of Xiaowu, the terminal sends a target file obtaining request to the server.

In step 407, the server determines an initial file based on the obtaining request.

In step 408, the server determines comment information of the initial file, where the comment information includes location information (of the commented portion within the initial file), commenting object information (i.e., identification of the commentor), and comment content information.

The file content has different forms. The location information may have different forms during storage, and location information of a document mainly including a text may be a start value corresponding to a start location of the target content, and a value offset of an end value at the end of the target content relative to the start value of the start location.

For example, the location information of the target content "this solution" is indicated by a start value 23 and a value offset 3.

In step 409, the server adds the comment identifier, the commenting object, and the comment content of the target content corresponding to location information to the file content of the initial file, to obtain a target file, and sends the target file to the requesting terminal.

In step 410, the terminal receives the target file and displays the target file on the file content page.

For example, referring to FIG. 25, the file content of the target file and the comment identifier of the target content "this solution" are displayed.

In another example, referring to FIG. 26, the file content of the target file, the comment identifiers of the target content "this solution", "presentation audio B2.mp3", and "technical point", and the profile picture (a bear) and the comment content ("@ Xiaoyi: whether to write text content of audio?") of the commenting object (e.g., the commentor) corresponding to the comment message during the viewing operation are displayed. Xiaosi clicks on the comment identifier of the target content "this solution", a profile picture and comment content of a commenting object of "presentation audio B2.mp3" are automatically hidden, and a profile picture and comment content of a commenting object corresponding to "this solution" are displayed in a group. Xiaosi then clicks on the comment identifier of the target content "technical point", a profile picture and comment content of a commenting object of "this solution" are automatically hidden, and a profile picture and comment content of the commenting object corresponding to "technical point" are displayed. Xiaosi then clicks on the "next comment" button on the file content page, content displayed on the file content page is switched, another part of file content of the target file is displayed, and a profile picture and comment content of a commenting object of first target content of this part of file content are displayed.

For example, referring to FIG. 27, when the file content of the target file, and the comment identifiers of the target content "this solution", "presentation audio B2.mp3", and "technical point" are displayed, and profile pictures and comment content of all commenting objects of the target content corresponding to comment messages during the viewing operation are displayed respectively, when Xiaosi selects "solution", the "Hide comment" button is displayed. After Xiaosi triggers the button, the file content page hides all comment identifiers, commenting objects, and comment content. When Xiaosi selects any content such as "solution" from the file content, a "Display comment" button is displayed. After Xiaosi triggers the button, the file content page displays all the comment identifiers again.

Figure 28:
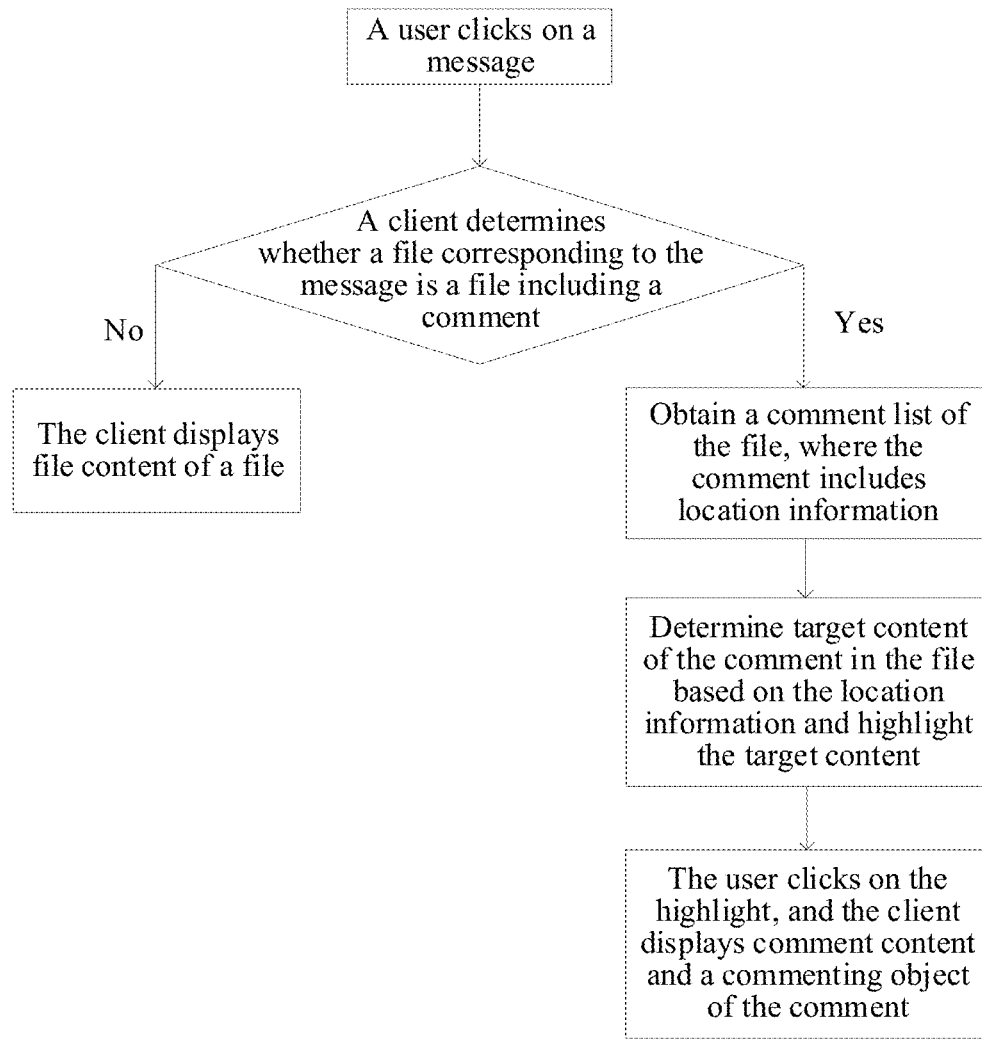
FIG. 28 is a schematic flowchart of a local procedure of a commenting method according to an embodiment of this disclosure.

FIG. 28 is an example of a partial procedure of interaction between the user and the instant messaging client. In addition to a comment message including a file identifier, history messages of the session page may further include a file message including a file identifier, a reference message including a file message including the file identifier and a comment on the file message, or the like. The user clicks on the file identifier in the message, and the client determines whether the file corresponding to the file identifier includes a comment based on a user operation. If not, the client directly displays the file content of the file, or if yes, the client obtains a comment list of the file. The comment includes location information, comment content, and a commenting object, and the client determines corresponding target content of the comment in the file according to location information and highlights the target content. The user may click on highlight, and the client displays the comment content and the commenting object of the comment.

For example, a user 1, a user 2, and a user 3 are three members of a group in the instant messaging software. The group session page of the user 1 displays a file message sent by the user 2 in the group. The user 1 clicks on the file message, and the instant messaging client of the user 1 displays the file content page. The file content page includes the file content of the target file corresponding to the file message. The user 1 selects "parameter" from the file content as the target content. The user 1 selects "parameter", the client displays the commenting button corresponding to the target content, and the user 1 clicks on the commenting button. The client displays the group session page of the user 1, and the user 1 edits the comment content of "parameter" on the group session page. When the user 1 completes the commenting operation, the client adds a comment identifier to the target content, and sends a comment message to the group. The comment message includes the target content, the comment content of the user 1 on the target content, and the file identifier of the target file. The file content page is displayed. The user 1 may click on the session display button on the file content page, and the group session page is displayed, where the session page includes the comment message of the user 1.

A session page of the user 3 displays the comment message of the user 1, and the user 3 may click on the comment message. The client of the user 3 displays the file content page, and the file content page includes the file content of the target file and the comment identifier of the target content. The user 3 may click on the comment identifier, and the client may display the comment content of the user 1 on the target content. In addition, the file content page may further display another comment identifier, and the user 3 may click on the comment identifier to view the comment content and the commenting object. The user 3 may further hide comment content and the commenting objects through the comment hiding button, hide the comment identifier through the identifier hiding button, and display the hidden comment identifier through the identifier display button.

As can be seen from the above, this solution may display the comment of the object on the file content directly on the session page in the form of a comment message. Based on the commenting operation of the object, the session page of the instant messaging client displays the latest comment in real time, and there is no need to repeatedly open the file to view the comment. In addition, if comment information included in a comment message needs to be viewed with reference to the file content, the comment message may be directly selected, the target content corresponding to the comment message may be automatically positioned, and the comment content and the commenting object are displayed. In this way, the comment information included in the comment message may be intuitively and quickly viewed in the file content. In conclusion, this solution can effectively simplify operation steps and improve efficiency.

To better implement the file commenting method provided in the embodiments of this disclosure, an embodiment of this disclosure further provides an apparatus based on the foregoing file commenting method. Terms have meanings the same as those in the foregoing file commenting method. For specific implementation details, reference may be made to the description in the method embodiments.

Figure 29:
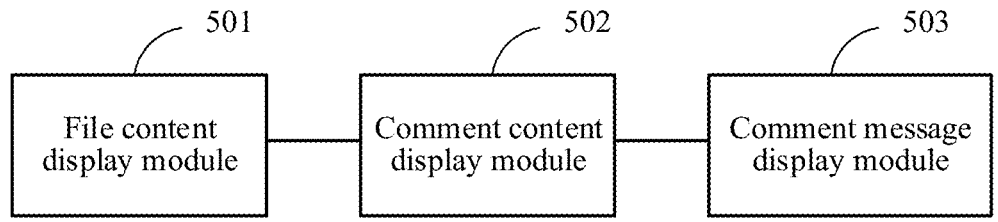
FIG. 29 is a schematic structural diagram of a file commenting apparatus according to an embodiment of this disclosure.

FIG. 29 is a schematic structural diagram of a file commenting apparatus according to an embodiment of this disclosure. The file commenting apparatus may include a file content display module 501, a comment content display module 502, and a comment message display module 503 as follows. One or more modules or submodules of the apparatus can be implemented by processing circuitry, software, or a combination thereof, for example.

The file content display module 501 is configured to display a file content page of an instant messaging client, where the file content page includes file content of a target file.

The comment content display module 502 is configured to display comment content of target content based on a commenting operation performed on the target content of the file content.

The comment message display module 503 is configured to display a session page of a commenting object in response to a determination that the commenting operation performed on the target content is completed, where the session page includes a comment message of the target file that is sent by the commenting object, and the comment message includes the target content, the comment content, and a file identifier of the target file.

Figure 30:
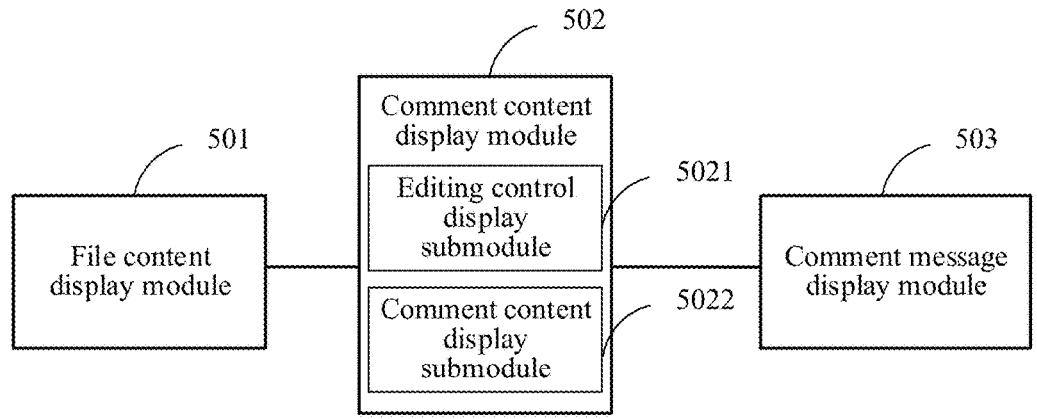
FIG. 30 is another schematic structural diagram of a file commenting apparatus according to an embodiment of this disclosure.

In some embodiments of this disclosure, referring to FIG. 30, the comment content display module 502 includes: an editing control display submodule 5021 and a comment content display submodule 5022.

The editing control display submodule 5021 is configured to display a comment editing control of target content in response to detection of a selection operation performed on the target content of the file content.

The comment content display submodule 5022 is configured to display the comment content of the target content based on an editing operation performed on the comment editing control.

In some embodiments of this disclosure, the editing control display submodule 5021 includes a comment control display unit and an editing control display unit.

The comment control display unit is configured to display a comment control of target content in response to detection of a selection operation performed on the target content of the file content.

The editing control display unit is configured to display the comment editing control of the target content based on a triggering operation performed on the comment control.

In some embodiments of this disclosure, the comment content editing page includes a history message display area and a comment content editing area, the comment content editing area includes a comment editing control, and the history message display area includes a history message sent by an object in the session. The editing control display submodule 5021 is specifically configured to display the comment content of the target content based on a triggering operation performed on the comment editing control in the content editing area.

In some embodiments of this disclosure, the comment editing control includes a comment editing sub-control and a comment determining sub-control. The editing control display submodule 5021 is specifically configured to display the comment content of the target content based on an editing operation performed on the comment editing sub-control of the comment editing control.

The comment message display module 503 is specifically configured to determine that the commenting operation performed on the target content is completed in response to detection of a triggering operation performed on the comment determining sub-control and display the session page of the commenting object.

Figure 31:
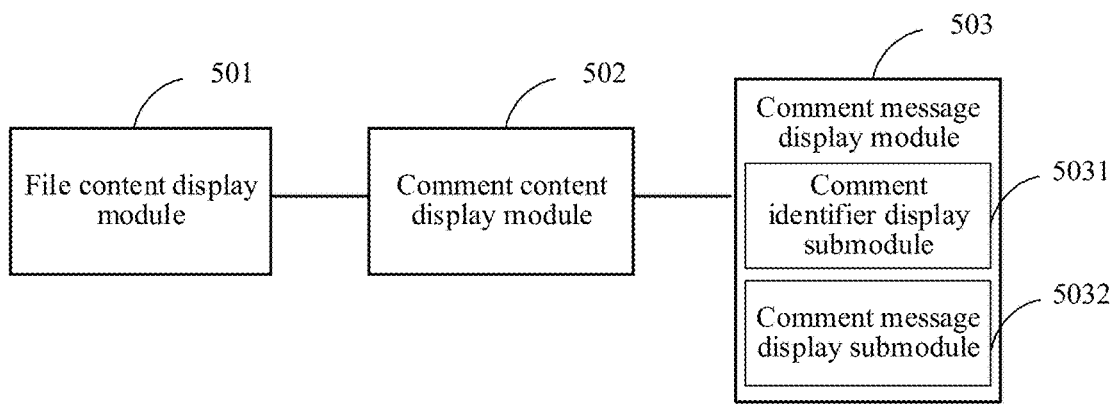
FIG. 31 is another schematic structural diagram of a comment viewing apparatus according to an embodiment of this disclosure.

In some embodiments of this disclosure, referring to FIG. 31, the comment message display module 503 includes a comment identifier display submodule 5031 and a comment message display submodule 5032.

The comment identifier display submodule 5031 is configured to display a file content page in response to a determination that the commenting operation performed on the target content is completed, where the file content page includes the file content of the target file, a comment identifier of the target content, and a session display control.

The comment message display submodule 5032 is configured to switch, in response to detection of a triggering operation performed on the session display control, to the session page for displaying the commenting object.

In some embodiments of this disclosure, the comment content includes a specified message receiving identifier and comment editing content, and the comment content display submodule 5022 is specifically configured to display a specified message receiving identifier of the target object based on a specified operation performed on the target object in the comment editing control; and display, based on a content editing operation in the comment editing control, comment editing content of the target content that corresponds to the specified message receiving identifier of the target object.

In some embodiments of this disclosure, the file content display module 501 is specifically configured to display a file list page of the commenting object in the instant messaging client, where the file list page includes a file identifier of at least one file; and display, based on a determining operation performed on a target file identifier, a file content page corresponding to the target file identifier.

In some embodiments of this disclosure, the file content display module 501 is specifically configured to display the session page of the commenting object in the instant messaging client, where the session page includes a file message of a target file that is sent by an object in a session; and display a file content page in response to detection of a viewing operation performed on the file message, where the file content page includes file content of the target file.

In this embodiment of this disclosure, the file content display module 501 displays a file content page of an instant messaging client, where the file content page includes file content of a target file; the comment content display module 502 displays comment content of target content based on a commenting operation performed on the target content of the file content; and the comment message display module 503 displays a session page of a commenting object in response to a determination that the commenting operation performed on the target content is completed, where the session page includes a comment message of the target file that is sent by the commenting object, and the comment message includes the target content, the comment content, and a file identifier of the target file. In this embodiment, when the commenting operation is completed, the comment message including the file identifier of the target file, the target content, the comment content, and the commenting object is displayed on the session page of the instant messaging client, which is different from the related art in which a file corresponding to a file identifier needs to be opened and then a comment is viewed. Therefore, this embodiment can effectively simplify steps and improve the viewing efficiency.

To better implement the comment viewing method provided in the embodiments of this disclosure, an embodiment of this disclosure further provides an apparatus based on the foregoing comment viewing method. Terms have meanings the same as those in the foregoing comment viewing method. For specific implementation details, reference may be made to the description in the method embodiments.

Figure 32:
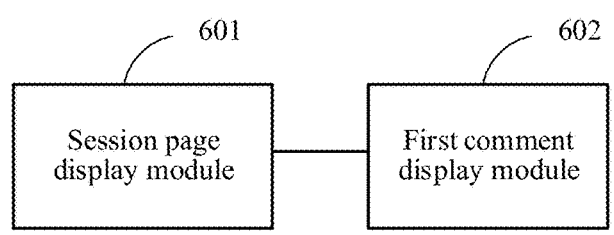
FIG. 32 is a schematic structural diagram of a comment viewing apparatus according to an embodiment of this disclosure.

FIG. 32 is a schematic structural diagram of a comment viewing apparatus according to an embodiment of this disclosure. The comment viewing apparatus may include a session page display module 601 and a first comment display module 602 as follows.

The session page display module 601 is configured to display a session page of an instant messaging client, where the session page includes a first comment message sent by a first commenting object, and the first comment message includes comment content of the first commenting object on first target content of a target file.

The first comment display module 602 is configured to display a first file content page in response to detection of a viewing operation performed on the comment message, where the first file content page includes: file content of the target file, a comment identifier of the first target content of file content, the comment content of the first target content, and the first commenting object.

Figure 33:
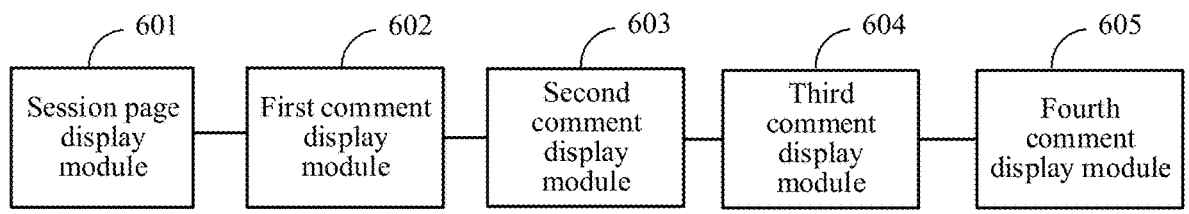
FIG. 33 is another schematic structural diagram of a comment viewing apparatus according to an embodiment of this disclosure.

In some embodiments of this disclosure, the first file content page further includes a comment identifier of at least one piece of second target content; and the comment viewing apparatus includes: a second comment display module 603, configured to display comment content of the second target content in response to detection of a viewing operation performed on the comment identifier of the second target content, where the comment content of the second target content includes comment content of the first commenting object on the second target content or comment content of at least one second commenting object on the second target content, as shown in FIG. 33.

In some embodiments of this disclosure, the first file content page further includes: comment content of at least one second commenting object on the first target content; and the comment viewing apparatus includes a third comment display module 604, configured to display the comment content of the second commenting object on the first target content and the second commenting object on the first file content page in response to detection of a viewing operation performed on the comment message, as shown in FIG. 33.

In some embodiments of this disclosure, the first file content page includes an all-comment display control, and the comment viewing apparatus includes a fourth comment display module 605, configured to display comment content of all commenting objects on all target content on the first file content page in response to detection of a triggering operation performed on the all-comment display control, as shown in FIG. 33.

Figure 34:
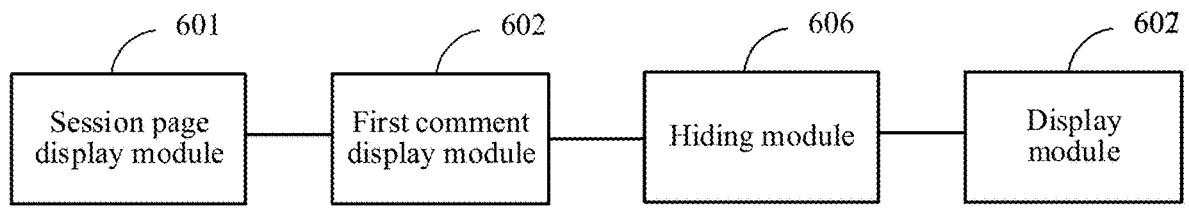
FIG. 34 is another schematic structural diagram of a comment viewing apparatus according to an embodiment of this disclosure.

In some embodiments of this disclosure, referring to FIG. 34, the comment viewing apparatus includes a hiding module 606 and a display module 607.

The hiding module 606 is configured to hide comment information of the target file in response to detection of a hiding operation performed on the first file content page.

The display module 607 is configured to display comment identifiers of all target content of the target file in response to detection of a comment display operation based on the file content page.

In some embodiments of this disclosure, the comment information includes comment content and a commenting object, and the hiding module 606 is specifically configured to hide comment content and a commenting object of the target file in response to detection of a comment content hiding operation performed on the first file content page.

In some embodiments of this disclosure, the comment information includes a comment identifier, and the hiding module 606 is specifically configured to display a comment identifier hiding control in response to detection of a selection operation performed on the first file content page; and hide comment identifiers of all target content of the target file based on a triggering operation performed on the comment hiding control.

In some embodiments of this disclosure, the first file content page includes an all-identifier hiding control, the comment information includes a comment identifier, and the hiding module 606 is specifically configured to hide comment identifiers of all target content of the target file in response to detection of a triggering operation performed on the all-identifier hiding control.

In some embodiments of this disclosure, file content of the target file includes first file content and second file content, the first file content page includes a page switching control, and the comment viewing apparatus includes a display page switching module, configured to in response to detection of a switching operation based on the page switching control, switch to display a second file content page, where the second file content page includes the second file content of the target file, a comment identifier of a target content of the second file content, and comment content of a comment identifier of at least one piece of target content.

Figure 35:
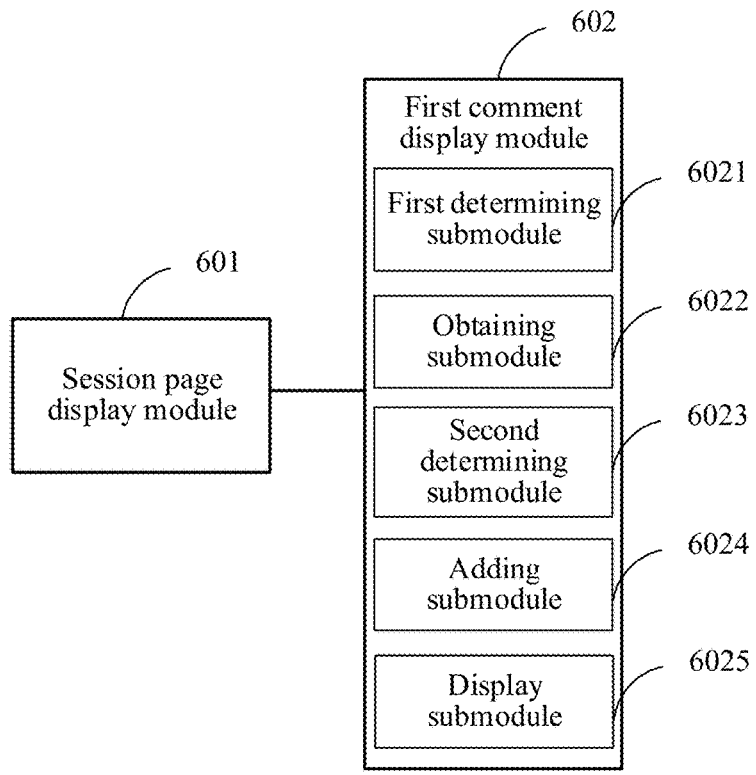
FIG. 35 is another schematic structural diagram of a comment viewing apparatus according to an embodiment of this disclosure.

In some embodiments of this disclosure, referring to FIG. 35, the first comment display module 602 includes a first determining submodule 6021, an obtaining submodule 6022, a second determining submodule 6023, an adding submodule 6024, and a display submodule 6025.

The first determining submodule 6021 is configured to determine an initial file based on the viewing operation performed on the first comment message.

The obtaining submodule 6022 is configured to obtain comment information of the initial file, where the comment information includes location information, commenting object information (i.e., identification of the commentor), and comment content information.

The second determining submodule 6023 is configured to determine target content of the initial file based on the location information.

The adding submodule 6024 is configured to add a comment identifier of the target content and comment content and a commenting object of the target content to file content of the initial file, to obtain a target file.

The display submodule 6025 is configured to display the first file content page, where the first file page includes file content of the target file.

In this embodiment of this disclosure, the session page display module 601 may display a session page of an instant messaging client, where the session page includes a first comment message sent by a first commenting object, and the first comment message includes comment content of the first commenting object on first target content of a target file. The first comment display module 602 displays a first file content page in response to detection of a viewing operation performed on the first comment message, where the first file content page includes: file content of the target file, a comment identifier of the first target content of file content, the comment content of the first target content, and the first commenting object. In this embodiment, the first target content in the file content may be quickly positioned based on the first comment message on the session page and the comment identifier of the first target content, and the comment content and the first commenting object of the first target content are viewed. Different from the related art in which the file needs to be opened and each piece of target content is viewed in the file to determine the first target content, this embodiment can significantly simplify steps and improve the viewing efficiency.

An embodiment of this disclosure provides a file commenting apparatus, including a content display module, configured to display a file content page of an instant messaging client, where the file content page includes file content of a target file; a control display module, configured to display a comment control of target content in response to detection of a selection operation performed on the target content of the file content; a session display module, configured to display a session page of a commenting object in response to detection of an operation performed on the comment control; a comment display module, configured to display comment editing content on the session page based on a comment editing operation performed on the target content on the session page; and a message display module, configured to: display, on the session page in response to a determination that the comment editing operation performed on the target content is completed, a comment message of the target file that is sent by the commenting object, and add a comment identifier to the target content of the file content, where the comment message includes the target content, the comment content, and a file identifier of the target file.

In some embodiments of this disclosure, the message display module includes a content display submodule and a message display submodule.

The content display submodule is configured to display a file content page in response to a determination that the comment editing operation performed on the target content is completed, where the file content page includes file content of the target file, a comment identifier of the target content, and a session display control.

The message display submodule is configured to switch to display the session page of the commenting object in response to detection of a triggering operation performed on the session display control and add the comment identifier to the target content of the file content, where a message display area of the session page includes a comment message of the target file that is sent by the commenting object.

In some embodiments of this disclosure, the comment content includes a specified message receiving identifier and comment editing content. The comment display module includes a receiving identifier display submodule and a comment content display submodule.

The receiving identifier display submodule is configured to display a specified message receiving identifier of the target object based on a specified operation performed on the target object in a content editing area.

The comment content display submodule is configured to display comment editing content in the content editing area based on a comment editing operation performed on the target content in the content editing area, where the comment editing content is comment content of the target content that corresponds to the specified message receiving identifier of the target object.

In some embodiments of this disclosure, the content display module is specifically configured to display a file list page of the commenting object in the instant messaging client, where the file list page includes a file identifier of at least one file; and display, based on a determining operation performed on a target file identifier, a file content page corresponding to the target file identifier.

In some embodiments of this disclosure, the content display module is specifically configured to display the session page of the commenting object in the instant messaging client, where the session page includes a file message of a target file that is sent by an object in a session; and display a file content page in response to detection of a viewing operation performed on the file message, where the file content page includes file content of the target file.

Figure 36:
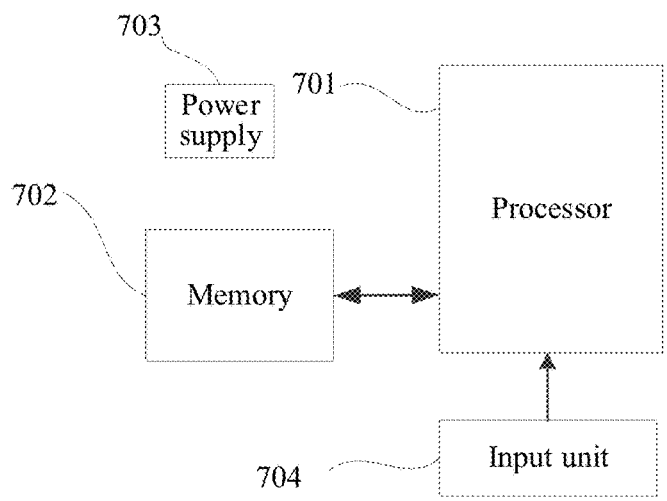
FIG. 36 is a schematic structural diagram of a computer device according to an embodiment of this disclosure.

In addition, an embodiment of this disclosure further provides a computer device, and the computer device may be a terminal or a server. FIG. 36 is a schematic structural diagram of a computer device in an embodiment of this disclosure.

The computing device may include components such as processing circuitry (e.g., a processor 701) of one or more processing cores, a memory 702 (e.g., a non-transitory computer-readable storage medium) of one or more computer readable storage media, a power supply 703, and an input unit 704. A person skilled in the art may understand that, the structure of the computer device shown in FIG. 36 does not constitute a limitation to the computer device. The computer device may include components that are more or fewer than those shown in the figure, or some components may be combined, or a different component deployment may be used.

The processor 701 is a control center of the computer device and is connected to various parts of the computer device by using various interfaces and lines. By running or executing software programs and/or modules stored in the memory 702, and invoking data stored in the memory 702, the processor performs various functions and data processing of the computer device, thereby performing overall monitoring on the computer device. The processor 701 may include one or more processing cores. The processor 701 may integrate an application processor and a modem processor. The application processor mainly processes an operating system, a user interface, an application program, and the like. The modem processor mainly processes wireless communication. It may be understood that the modem processor may not be integrated into the processor 701.

The memory 702 may be configured to store a software program and module. The processor 701 runs the software program and module stored in the memory 702, to execute various functional applications and data processing. The memory 702 may mainly include a program storage area and a data storage area. The program storage area may store an operating system, an application program corresponding to at least one function (for example, a sound playback function and an image display function), and the like. The data storage area may store data created according to use of the computer device, and the like. In addition, the memory 702 may include a high-speed random access memory, and may also include a nonvolatile memory, for example, at least one magnetic disk storage device, a flash memory, or another volatile solid-status storage device. Correspondingly, the memory 702 may further include a memory controller, to provide access of the processor 701 to the memory 702.

The computer device further includes the power supply 703 for supplying power to the components. The power supply 703 may be logically connected to the processor 701 by using a power management system, thereby implementing functions such as charging, discharging, and power consumption management by using the power management system. The power supply 703 may further include one or more of a direct current or alternating current power supply, a re-charging system, a power failure detection circuit, a power supply converter or inverter, a power supply state indicator, and any other component.

The computer device may further include the input unit 704. The input unit 704 may be configured to receive input digit or character information and generate keyboard, mouse, joystick, optical, or trackball signal input related to user settings and function control.

Although not shown in the figure, the computer device may further include a display unit, and the like. Details are not described herein again. Specifically, in this embodiment, the processor 701 in the computer device may load, according to the following computer-readable instructions, executable files corresponding to processes of one or more application programs into the memory 702. The processor 701 runs the application programs stored in the memory 702, to implement the steps in any one of file commenting and comment viewing methods. For example, a file content page of an instant messaging client is displayed, where the file content page includes file content of a target file; comment content of target content is displayed based on a commenting operation performed on the target content of the file content; and a session page of a commenting object is displayed in response to a determination that the commenting operation performed on the target content is completed, where the session page includes a comment message of the target file that is sent by the commenting object, and the comment message includes the target content, the comment content, and a file identifier of the target file.

In an embodiment, a session page of an instant messaging client is displayed, where the session page includes a first comment message sent by a first commenting object, and the first comment message includes comment content of the first commenting object on first target content of a target file; and a first file content page is displayed in response to detection of a viewing operation performed on the first comment message, where the first file content page includes: file content of the target file, a comment identifier of the first target content of file content, the comment content of the first target content, and the first commenting object.

In an embodiment, a file content page of an instant messaging client is displayed, where the file content page includes file content of a target file; a comment control of target content is displayed in response to detection of a selection operation performed on the target content of the file content; a session page of a commenting object is displayed in response to detection of an operation performed on the comment control; and comment editing content is displayed on the session page based on a comment editing operation performed on the target content on the session page; and a comment message of the target file that is sent by the commenting object is displayed on the session page in response to a determination that the comment editing operation performed on the target content is completed, and a comment identifier is added to the target content of the file content, where the comment message includes the target content, the comment content, and a file identifier of the target file.

A person of ordinary skill in the art could understand that all or some steps of various embodiments in the embodiments may be implemented through computer-readable instructions or implemented through the computer-readable instructions controlling relevant hardware, and the instructions may be stored in a non-volatile storage medium of one or more computer-readable instructions and loaded and executed by one or more processors.

Therefore, the embodiments of this disclosure further provides one or more non-volatile storage media storing computer-readable instructions, when executed by one or more processors, the computer-readable instructions causing the one or more processors to perform the steps in any one of the file commenting and comment viewing methods provided in the embodiments of this disclosure. For example, the computer-readable instructions may perform the following steps: displaying a file content page of an instant messaging client, where the file content page includes file content of a target file; displaying comment content of target content based on a commenting operation performed on the target content (e.g., a portion) of the file content; displaying a session page of a commenting object in response to a determination that the commenting operation performed on the target content is completed, where the session page includes a comment message of the target file that is sent by the commenting object, and the comment message includes the target content, the comment content, and a file identifier of the target file.

In an embodiment, displaying a session page of an instant messaging client, where the session page includes a first comment message sent by a first commenting object, and the first comment message includes comment content of the first commenting object on first target content of a target file; and displaying a first file content page in response to detection of a viewing operation performed on the first comment message, where the first file content page includes: file content of the target file, a comment identifier of the first target content of file content, the comment content of the first target content, and the first commenting object.

In an embodiment, displaying a file content page of an instant messaging client, where the file content page includes file content of a target file; displaying a comment control of target content in response to detection of a selection operation performed on the target content of the file content; displaying a session page of a commenting object in response to detection of an operation performed on the comment control; and displaying comment editing content on the session page based on a comment editing operation performed on the target content on the session page; and displaying a comment message of the target file that is sent by the commenting object on the session page in response to a determination that the comment editing operation performed on the target content is completed, and adding a comment identifier to the target content of the file content, where the comment message includes the target content, the comment content, and a file identifier of the target file.

In an embodiment, this disclosure provides a computer program product or a computer program. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the foregoing method embodiments.

The system related to the embodiments of this disclosure may be a distributed system formed by connecting a client to a plurality of nodes (computer devices in any form in an access network, such as, servers and terminals) in a network communication form.

Figure 37:
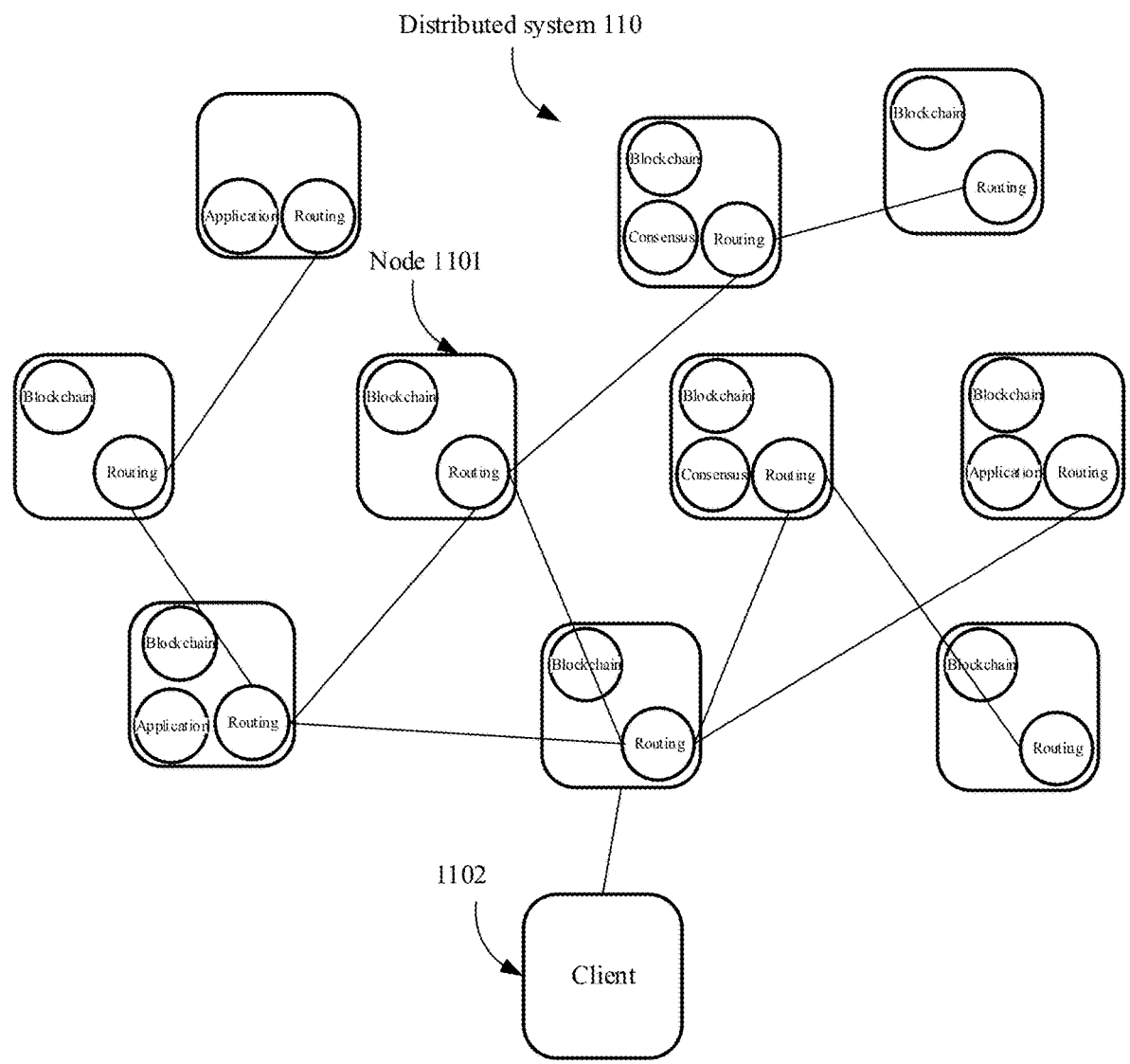
FIG. 37 is a schematic structural diagram of a blockchain according to an embodiment of this disclosure.

For example, the distributed system is a blockchain system. Referring to FIG. 37, FIG. 37 is a schematic structural diagram of a distributed system 110 applied to a blockchain system according to an embodiment of this disclosure. The distributed system is formed of a plurality of nodes 1101 (computing devices in any form in an access network, such as, servers and user terminals) and a client 1102. A peer-to-peer (P2P) network is formed between the nodes. The P2P protocol is an application-layer protocol running over the Transmission Control Protocol (TCP). Any machine such as a server or a terminal may be added to the distributed system to become a node. The nodes include a hardware layer, an intermediate layer, an operating system layer, and an application layer.

Referring to functions of each node in the blockchain system shown in FIG. 37, the related functions include a routing function, which is a basic function of a node and is used for supporting communication between nodes.

In addition to the routing function, the node may further have an application function, which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain system, so that the another node adds the recorded data to a temporary block when successfully verifying a source and integrity of the recorded data.

For example, services implemented by the application may include a wallet service used for providing a transaction function with electronic money, including transaction initiation (that is, a transaction record of a current transaction is transmitted to another node in the blockchain system, and the another node stores, after successfully verifying the transaction record, recorded data of the transaction to a temporary block in a blockchain in response to admitting that the transaction is valid). The wallet service further supports querying for remaining electronic money in an electronic money address.

Another service implemented by the application may include a shared ledger service used for providing functions of operations such as storage, query, and modification of account data. Recorded data of the operations on the account data is transmitted to another node in the blockchain system. The another node stores, after verifying that the account data is valid, the recorded data to a temporary block in response to admitting that the account data is valid and may further transmit an acknowledgement to a node initiating the operations.

Another service implemented by the application may include a shared contract service which is a computerized protocol, may be used for executing conditions of a contract, and is implemented by using code that is deployed in the shared ledger and that is executed when a condition is satisfied. The code is used for completing, according to an actual service requirement, an automated transaction, for example, searching for a delivery status of goods purchased by a purchaser, and transferring electronic money of the purchaser to an address of a merchant after the purchaser signs for the goods. The smart contract is not limited to a contract used for executing a transaction and may be further a contract used for processing received information.

In addition to the routing and application functions, the node may further have a blockchain function including a series of blocks that are consecutive in a chronological order of generation. Once a new block is added to the blockchain, the new block is no longer removed. The block records recorded data submitted by the node in the blockchain system.

The comment information, such as target content, comment content, and a commenting object in this embodiment, may be stored in a blockchain shared ledger through a node. A computer device (such as a terminal or a server) may obtain the comment information based on data stored in the shared ledger.

Figure 38:
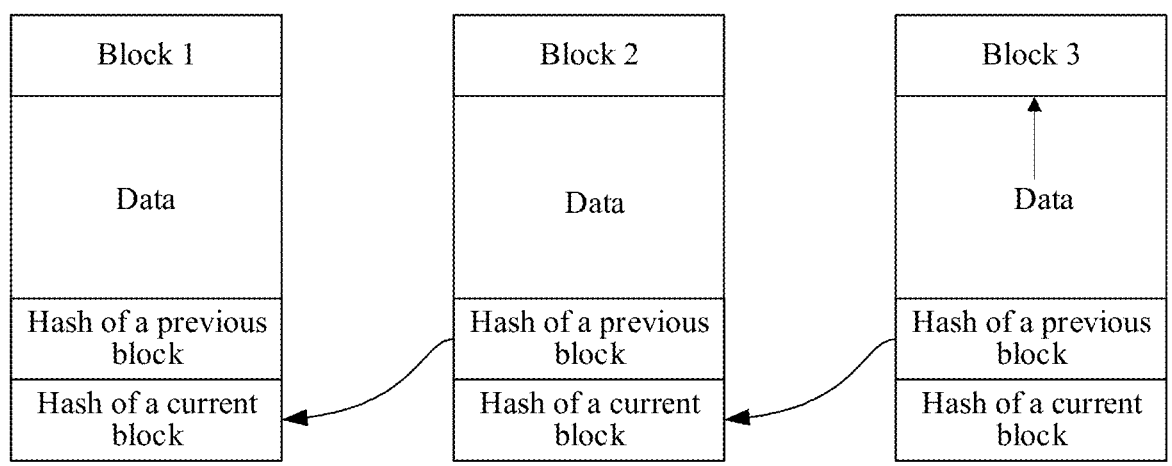
FIG. 38 is a schematic diagram of a block structure according to an embodiment of this disclosure.

Referring to FIG. 38, FIG. 38 is a schematic diagram of a block structure according to an embodiment of this disclosure. Each block includes a hash value of a transaction record stored in the current block (a hash value of the current block) and a hash value of a previous block. Blocks are connected according to hash values to form a blockchain. In addition, the block may further include information such as a timestamp indicating a block generation time. A blockchain is a decentralized database, and is a series of associated data blocks generated by using a cryptographic method. Each data block includes related information, and is configured to verify the validity (anti-counterfeiting) of the information of the data block, and generate a next block.

For specific implementations of the above operations, refer to the foregoing embodiments. Details are not described herein again.

The storage medium may include a read-only memory (ROM), a random access memory (RAM), a magnetic disk, an optical disc, or the like.

Because the computer program stored in the storage medium may perform the steps of any one of the file commenting and comment viewing methods provided in the embodiments of this disclosure, the computer program may implement beneficial effects that may be implemented by any one of the file commenting and comment viewing methods provided in the embodiments of this disclosure. For details, reference may be made to the foregoing embodiments. Details are not described herein again.

The file commenting and comment viewing methods provided in the embodiments of this disclosure are described above in detail. Although the principles and implementations of this disclosure are described by using specific examples in this specification, the descriptions of the foregoing embodiments are merely intended to help understand the method and the core idea of the method of this disclosure. Meanwhile, a person skilled in the art may make modifications to the specific implementations according to the idea of this disclosure.

What is claimed is:

1. A file commenting method comprising:
    displaying, by processing circuitry of a computer device, a file content page of an instant messaging client, the file content page comprising file content and a file name corresponding to the file content;
    receiving, through the instant messaging client, a comment from a first user via a commenting operation performed on a selected portion of the file content, the comment including a name of a second user to whom the comment is directed among users participating in a group communication session;
    displaying, in the instant messaging client, a group communication session page in response to a determination that the commenting operation performed on the selected portion of the file content is completed, the group communication session page comprising the received comment, the selected portion of the file content on which the commenting operation was performed, the file name corresponding to the file content, and identification of the first user from whom the comment was received;
    in response to a determination that a second comment on a second selected portion of the file content is received from the second user, the second comment including a name of a receiving user to whom the second comment is directed, displaying, in the instant messaging client of the first user, the second comment including the name of the receiving user as a recipient of the second comment; and
    in response to a determination that the receiving user of the second comment is the first user, displaying, in the instant messaging client of the first user, a prompt for the first user to view the second comment.

2. The method according to claim 1, wherein the receiving the comment comprises:
    displaying a comment editing control in response to detection of a selection operation performed on the portion of the file content; and
    displaying the received comment based on an editing operation performed on the comment editing control.

3. The method according to claim 2, wherein the displaying the comment editing control comprises:
    displaying a comment control in response to the detection of the selection operation performed on the portion of the file content; and
    displaying the comment editing control based on a triggering operation performed on the comment control.

4. The method according to claim 2, wherein
    a comment content editing page comprises a comment content editing area, and the comment content editing area comprises the comment editing control; and
    the displaying the received comment based on the editing operation performed on the comment editing control comprises:
        displaying the received comment based on a triggering operation performed on the comment editing control in the comment content editing area.

5. The method according to claim 2, wherein the comment editing control comprises a comment editing sub-control and a comment determining sub-control; and
    the displaying the received comment based on the editing operation performed on the comment editing control comprises:
        displaying the received comment based on an editing operation performed on the comment editing sub-control of the comment editing control; and the displaying the group communication session page comprises:
  determining that the commenting operation performed on the selected portion of the file content is completed in response to detection of a triggering operation performed on the comment determining sub-control, and displaying the group communication session page.

6. The method according to claim 2, wherein the received comment comprises the name of the second user and comment editing content, and the displaying the received comment based on the editing operation performed on the comment editing control comprises:
  displaying the name of the second user based on a specified operation performed on the name of the second user in the comment editing control; and
  displaying, based on a content editing operation in the comment editing control, a received comment that is directed to the second user.

7. The method according to claim 1, wherein the displaying the group communication session page comprises:
  displaying the file content page in response to a determination that the commenting operation performed on the selected portion of the file content is completed, wherein the file content page comprises the file content, a comment identifier of the selected portion of the file content, and a session display control; and
  switching, in response to detection of a triggering operation performed on the session display control, the group communication session page.

8. The method according to claim 1, wherein the displaying the file content page comprises:
  displaying a file list page in the instant messaging client, wherein the file list page comprises a file identifier of at least one file; and
  displaying, based on a selected file identifier from the file list page, the file content page corresponding to the selected file identifier.

9. The method according to claim 1, wherein the displaying the file content page comprises:
  displaying the group communication session page in the instant messaging client, wherein the group communication session page comprises a file message of a target file that is sent by a participant in a group communication session; and
  displaying the file content page in response to detection of a viewing operation performed on the file message, wherein the file content page comprises file content of the target file.

10. A comment viewing method, comprising:
displaying, by processing circuitry of a computer device, a group communication session page of an instant messaging client, the group communication session page comprising a first comment message sent by a first commentor, and the first comment message comprising a comment received from the first commentor, a selected first portion of a target file to which the comment relates, a file name of the target file, identification of the first commentor, and a name of a second user to whom the comment is directed among users participating in the group communication session;
displaying a first file content page in response to detection of a viewing operation performed on the first comment message, the first file content page comprising: the target file, a comment identifier indicating the selected first portion of the target file to which the comment relates, the comment received from the first commentor, and the identification of the first commentor;
in response to a determination that a user of the computer device is the second user, displaying, by the processing circuitry of the computer device in the instant messaging client, a prompt for the user of the computer device to view the comment; and
in response to a determination that the user of the computer device is not the second user, displaying, in the instant messaging client, the comment including the name of the second user as a recipient of the comment.

11. The method according to claim 10, wherein the first file content page further comprises: a comment identifier of a second portion of the target file; and
the method further comprises:
  displaying comment content of the second portion of the target file in response to detection of a viewing operation performed on the comment identifier of the second portion of the target file, wherein the comment content of the second portion of the target file comprises: at least one of (i) comment content of the first commentor on the second portion of the target file or (ii) comment content of a second commentor on the second portion of the target file.

12. The method according to claim 11, wherein the first file content page comprises an all-comment display control, and the method further comprises:
  displaying comment content of all commentors on all portions of the target file on the first file content page in response to detection of a triggering operation performed on the all-comment display control.

13. The method according to claim 10, wherein the first file content page further comprises: comment content of a second commentor on the first portion of the target file; and
the method further comprises:
  displaying the comment content of the second commentor on the first portion of the target file and identification of the second commentor on the first file content page in response to detection of the viewing operation performed on the first comment message.

14. The method according to claim 13, wherein the target file comprises the first portion and a second portion, the first file content page comprises a page switching control, and the method further comprises:
  in response to detection of a switching operation based on the page switching control, switching to display a second file content page, wherein the second file content page comprises the second portion of the target file, a comment identifier of the second portion of the target file, and comment content on the second portion of the target file.

15. The method according to claim 10, wherein the method further comprises:
  hiding comment information of the target file in response to detection of a hiding operation performed on the first file content page.

16. The method according to claim 15, wherein the comment information comprises the comment content and the identification of the first commentor, and the hiding the comment information of the target file comprises:
  hiding the comment content and the identification of the first commentor in response to detection of a comment content hiding operation performed on the first file content page.

17. The method according to claim 15, wherein the comment information comprises the comment identifier of the first portion of the target file, and the hiding the comment information of the target file comprises:
- displaying a comment identifier hiding control in response to detection of a selection operation performed on the first file content page; and
- hiding comment identifiers of all portions of the target file based on a triggering operation performed on the comment identifier hiding control.

18. The method according to claim 17, wherein the method further comprises:
- displaying the comment identifiers of all the portions of the target file in response to detection of a comment display operation based on the first file content page.

19. The method according to claim 15, wherein the first file content page comprises an all-identifier hiding control, the comment information comprises the comment identifier of the first portion of the target file, and the hiding the comment information comprises:
- hiding comment identifiers of all portions of the target file in response to detection of a triggering operation performed on the all-identifier hiding control.

20. A file commenting method comprising:
- displaying, by processing circuitry of a computer device, a file content page of an instant messaging client, the file content page comprising file content and a file name corresponding to the file content;
- displaying a comment control in response to detection of a selection operation selecting a portion of the file content;
- displaying a comment editing control of a commentor in response to detection of an operation performed on the comment control;
- displaying comment content on the comment editing control based on a comment editing operation performed on the portion of the file content on the comment editing control, the comment content including a name of a recipient user to whom the comment is directed among users participating in a group communication session; and
- displaying, on a group communication session page in response to a determination that the comment editing operation performed on the portion of the file content is completed, a comment message, and adding a comment identifier to the portion of the file content, the comment message comprising the portion of the file content, the comment content, the file name corresponding to the file content, identification of the commentor, and the name of the recipient user to whom the comment is directed.

* * * * *